US010572982B2

(12) United States Patent
Beric et al.

(10) Patent No.: US 10,572,982 B2
(45) Date of Patent: Feb. 25, 2020

(54) METHOD AND SYSTEM OF IMAGE DISTORTION CORRECTION FOR IMAGES CAPTURED BY USING A WIDE-ANGLE LENS

(71) Applicant: Intel Corporation, Santa Clara, CA (US)

(72) Inventors: Aleksandar Beric, Eindhoven (NL); Kari Pulli, Belmont, CA (US); Nemanja Jankovic, Belgrad (RS); Zoran Zivkovic, Hertogenbosch (NL)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 15/724,993

(22) Filed: Oct. 4, 2017

(65) Prior Publication Data
US 2019/0102868 A1    Apr. 4, 2019

(51) Int. Cl.
| G06K 9/00 | (2006.01) |
| G06T 5/00 | (2006.01) |
| H04N 5/357 | (2011.01) |
| H04N 5/217 | (2011.01) |
| H04N 5/232 | (2006.01) |

(52) U.S. Cl.
CPC ............ *G06T 5/006* (2013.01); *H04N 5/217* (2013.01); *H04N 5/23229* (2013.01); *H04N 5/3572* (2013.01); *G06T 2207/20021* (2013.01); *G06T 2207/20172* (2013.01)

(58) Field of Classification Search
None
See application file for complete search history.

(56) References Cited

U.S. PATENT DOCUMENTS

| 2007/0025636 A1* | 2/2007 | Furukawa ................. G06T 1/60 |
| | | 382/275 |
| 2007/0188633 A1* | 8/2007 | Mandy .................. G06T 3/0018 |
| | | 348/241 |
| 2017/0199099 A1* | 7/2017 | Chen .................. G01M 11/0264 |

OTHER PUBLICATIONS

Imatest—Distortion Module, downloaded on Jan. 23, 2018 at: http://www.imatest.com/docs/distortion_instructions/; 22 pages; Digital Image quality testing ©2004-2017 Imatest LLC.
SPLINE (mathematics)—Wikipedia, https://en.wikipedia.org/wiki/Spline_(mathematics), downloaded on Jan. 23, 2018, 9 pages [This page was last edited on Jan. 20, 2018, at 02:04].
Devernay, F. et al., "Straight lines have to be straight: automatic calibration and removal of distortion from secnes of structured environments", Machine Vision and Applications Springer Verlag, 2001, 13 (1), pp. 14-24.
Freeman, B. et al., "Homographies, Mosaics and Panoramas", Computational Photography and Introduction to Computer Vision class, Lecture 10, , MIT, (2008) (5 pages).

(Continued)

*Primary Examiner* — Hadi Akhavannik
(74) *Attorney, Agent, or Firm* — Green, Howard, & Mughal LLP.

(57) ABSTRACT

Techniques related to image distortion correction for images captured by using a wide-angle lens include homography and a lens distortion correction using a radial-ratio-based look up table.

24 Claims, 25 Drawing Sheets

(56) References Cited

OTHER PUBLICATIONS

Hager, G. "2D Projective Geometry", Adapted from slides by N. Padoy,et al. CS600.361/600.461; www.cs.jhu.edu/~hager/teaching/cs461/Notes/Lect5-Homography; Week 5—Oct. 1, 2012, [fromFall 2011: https://cirl.lcsr.jhu.edu/vision_syllabus/vision-course-schedule-2012/] (45 pages).
Hartley, R. et al., "Multiple View Geometry in Computer Vision", Hartley and Zisserman, book title: Multiple View Geometry in computer vision, Chap. 4 title: Estimation-2D Projective Transformations, Cambridge Univ. Press (2003) (53 pages).
Karpenko, A. et al., "Digital Video Stabilization and Rolling Shutter Correction using Gyroscopes", Stanford Tech Report, CTSR Mar. 2011, Sep. 2011, 7 pages.
Zhang, Z. "A Flexible New Technique for Camera Calibration", Technical Report MSR-TR-98-71, 22 pages; IEEE Transactions on Pattern Analysis and Machine Intelligence (vol. 22, Iss: 11, Nov. 2000, p. 1330-1334).

\* cited by examiner

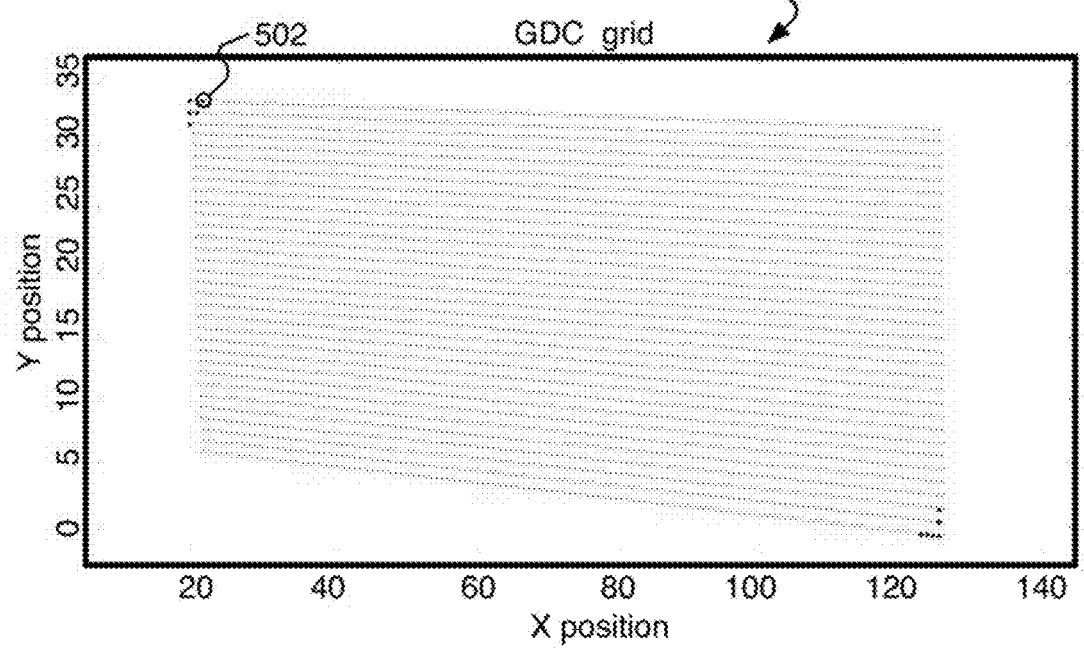
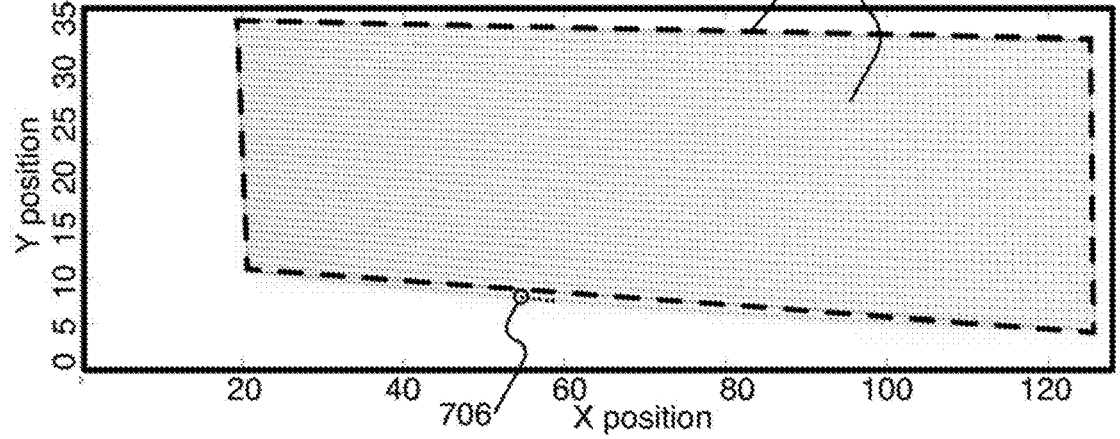
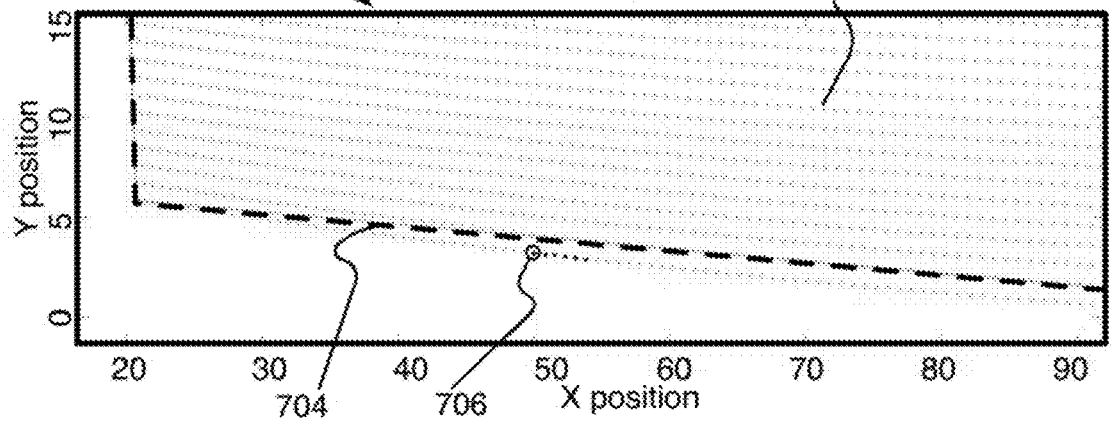

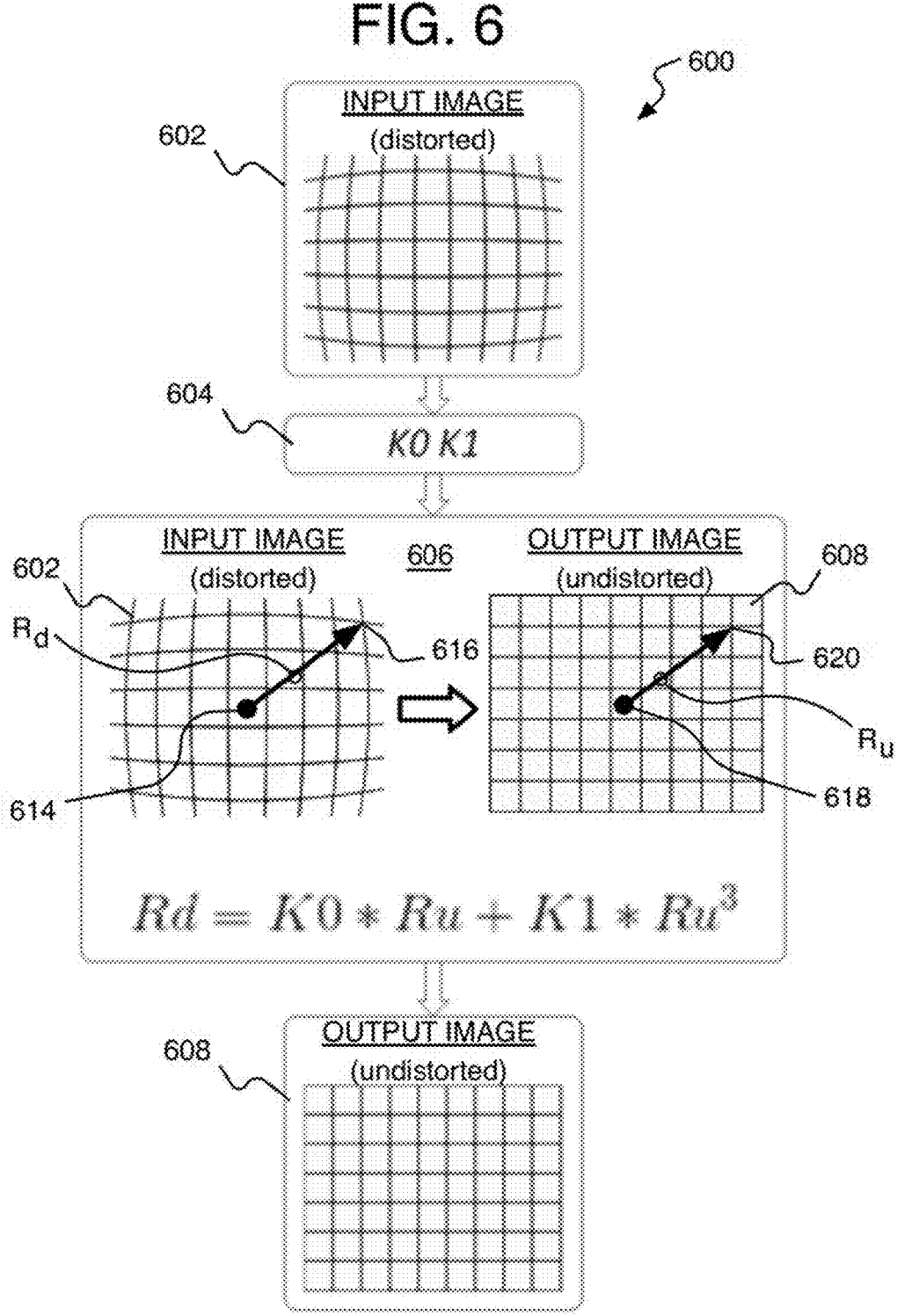

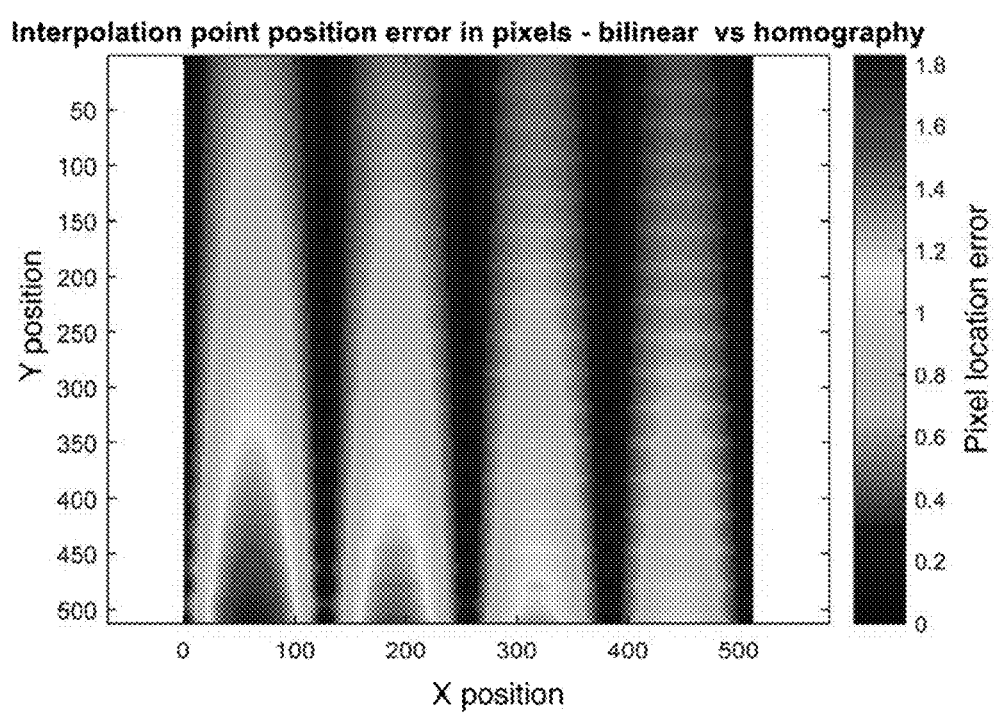

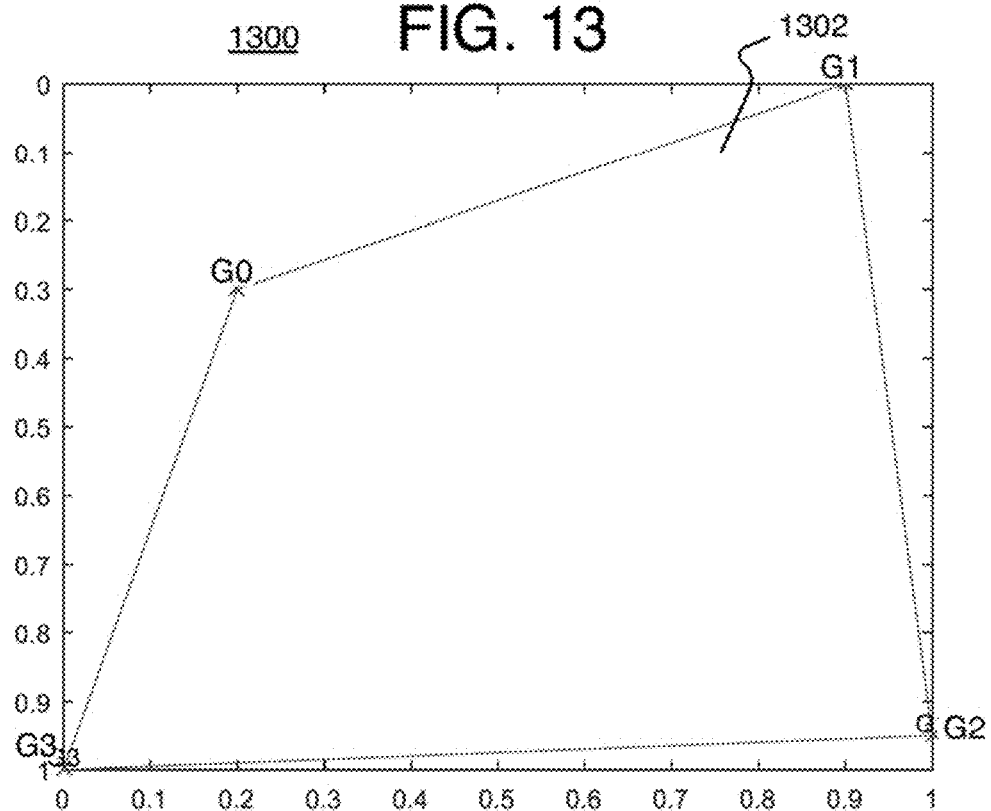
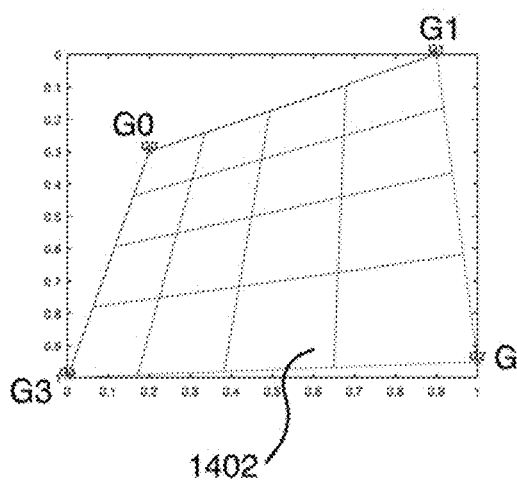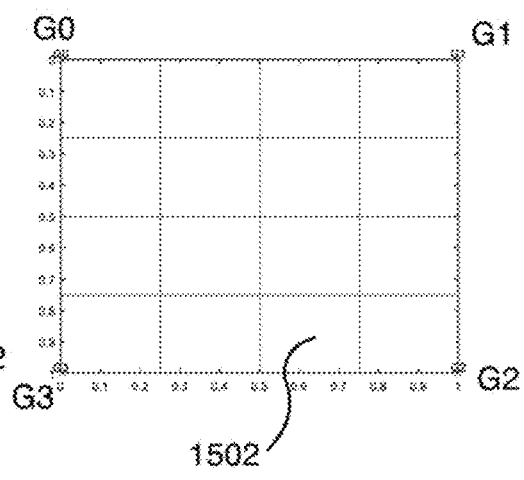

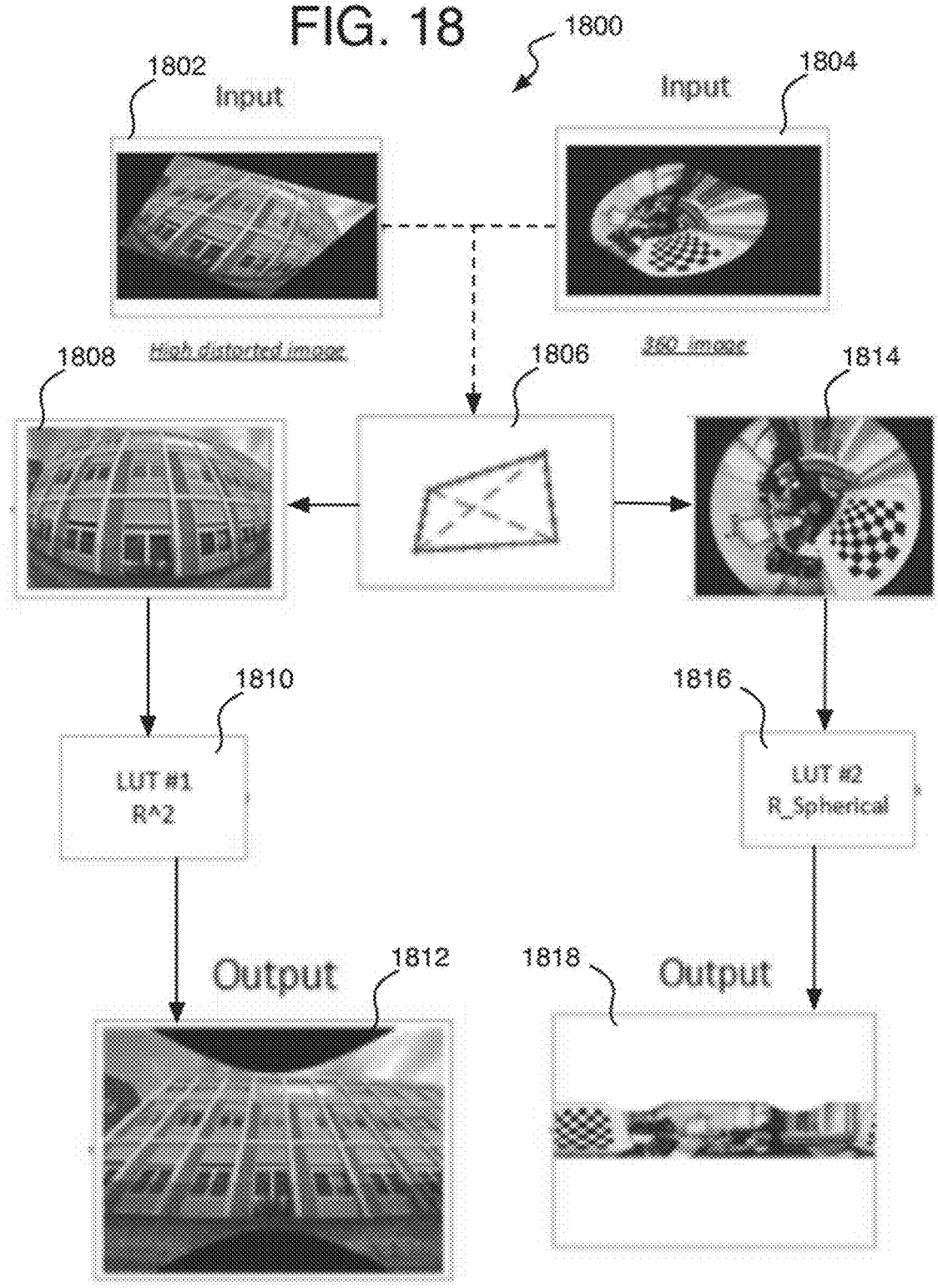

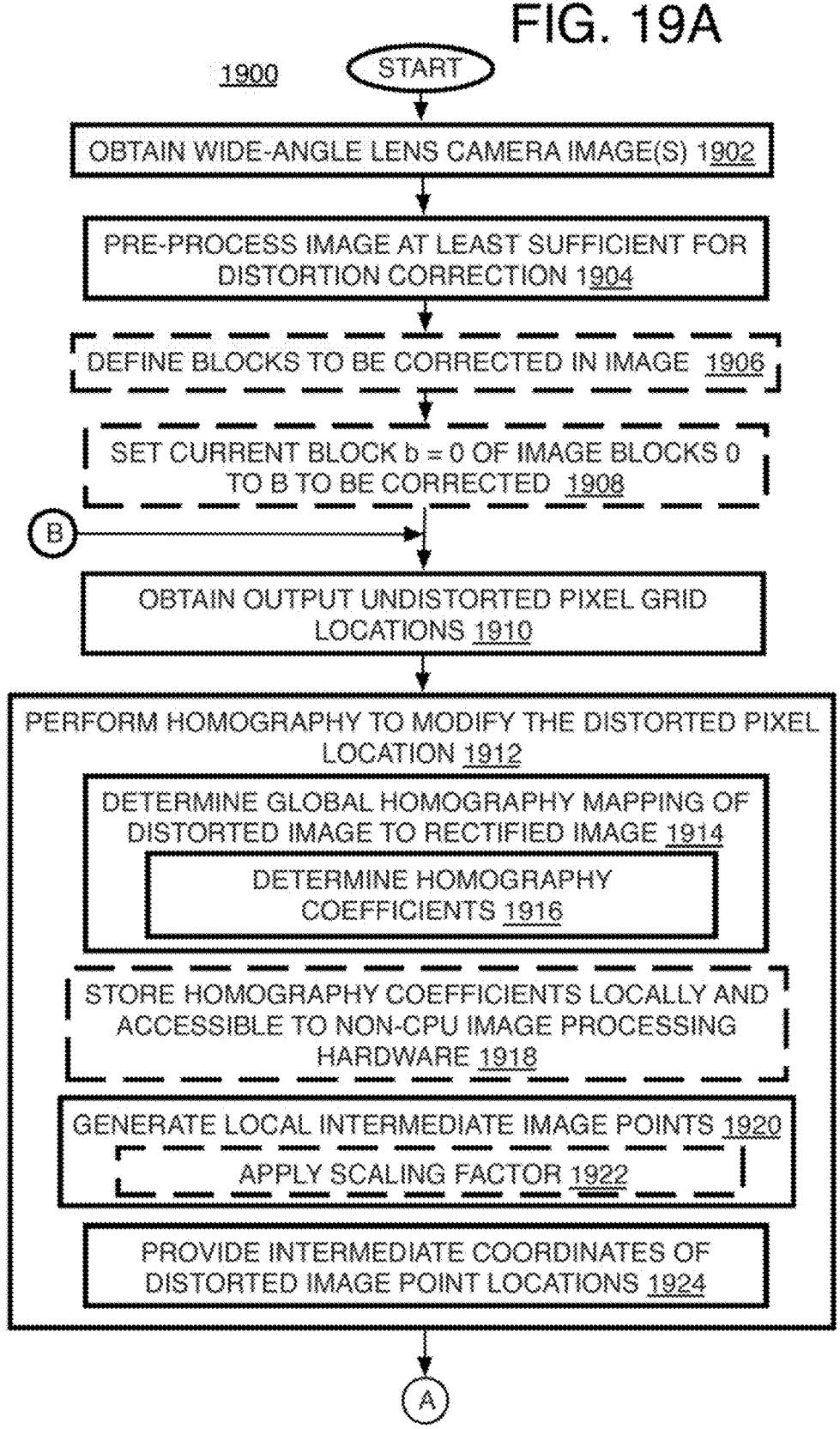

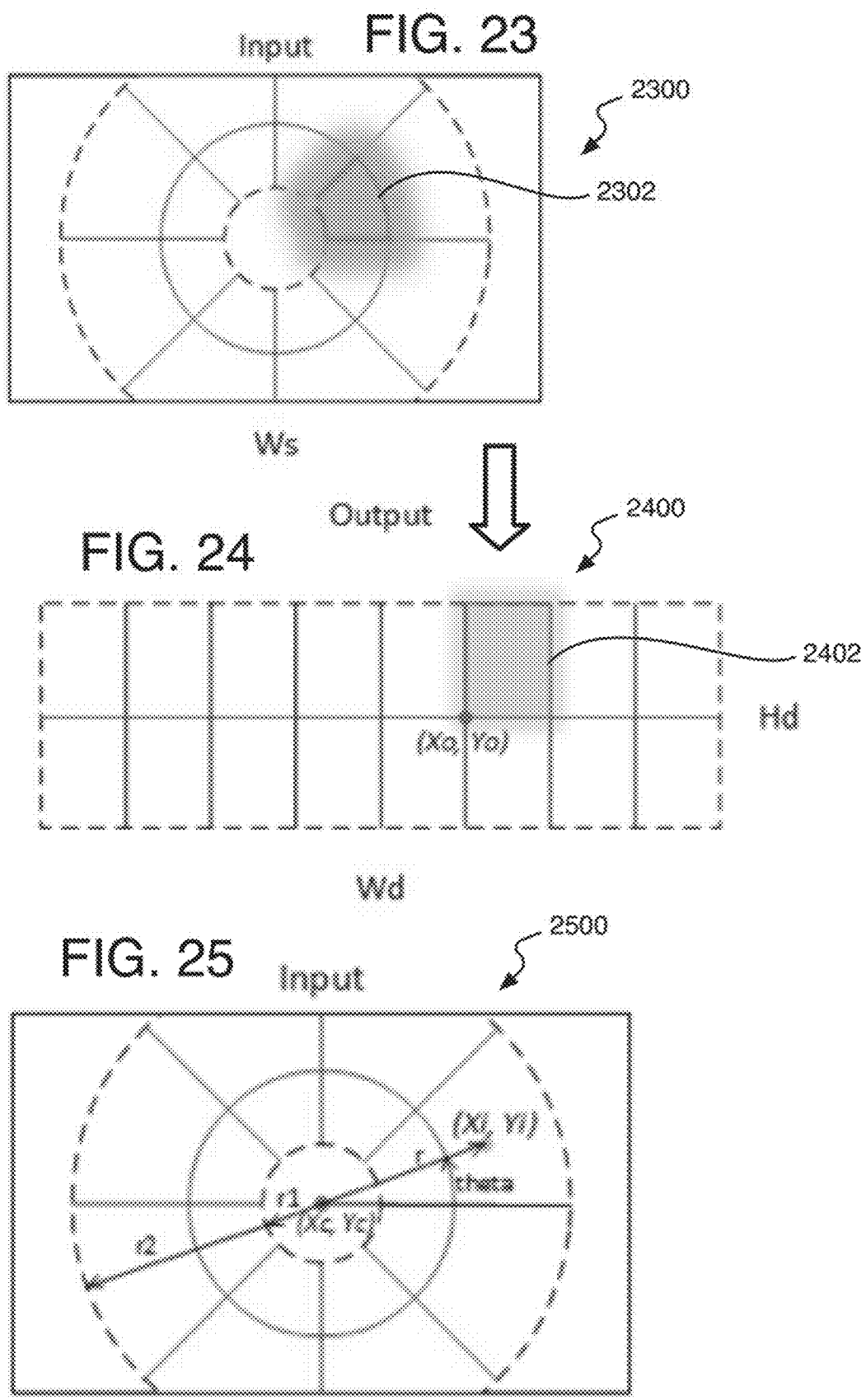

Average error per block - Barrel - Homog. + LDC

Maximum error per block - Barrel - Conventional

Average error per block - Moustache - conventional

Average error per block - Moustache - Homog. + LDC

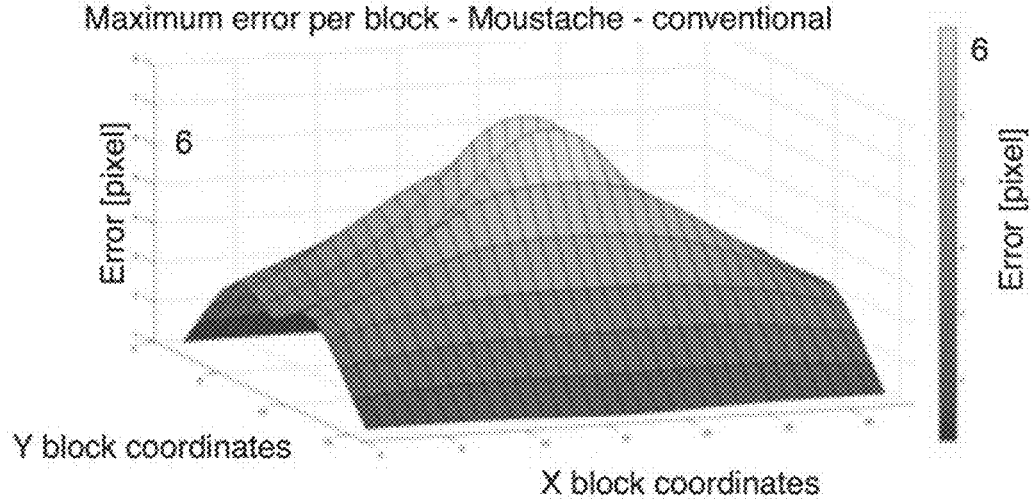
FIG. 38  3800
Maximum error per block - Moustache - conventional
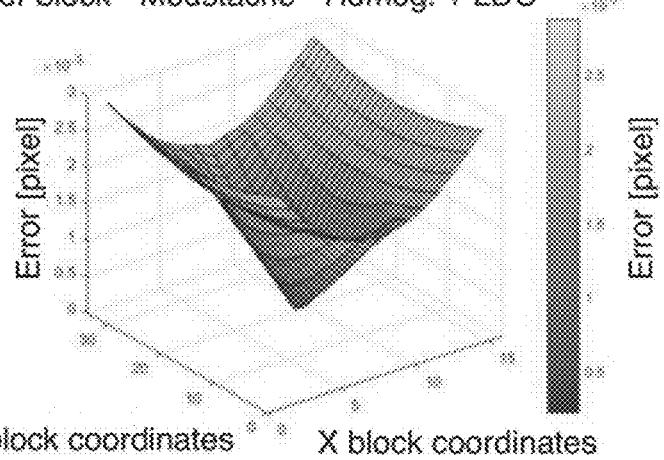
3900  FIG. 39
Maximum error per block - Moustache - Homog. + LDC

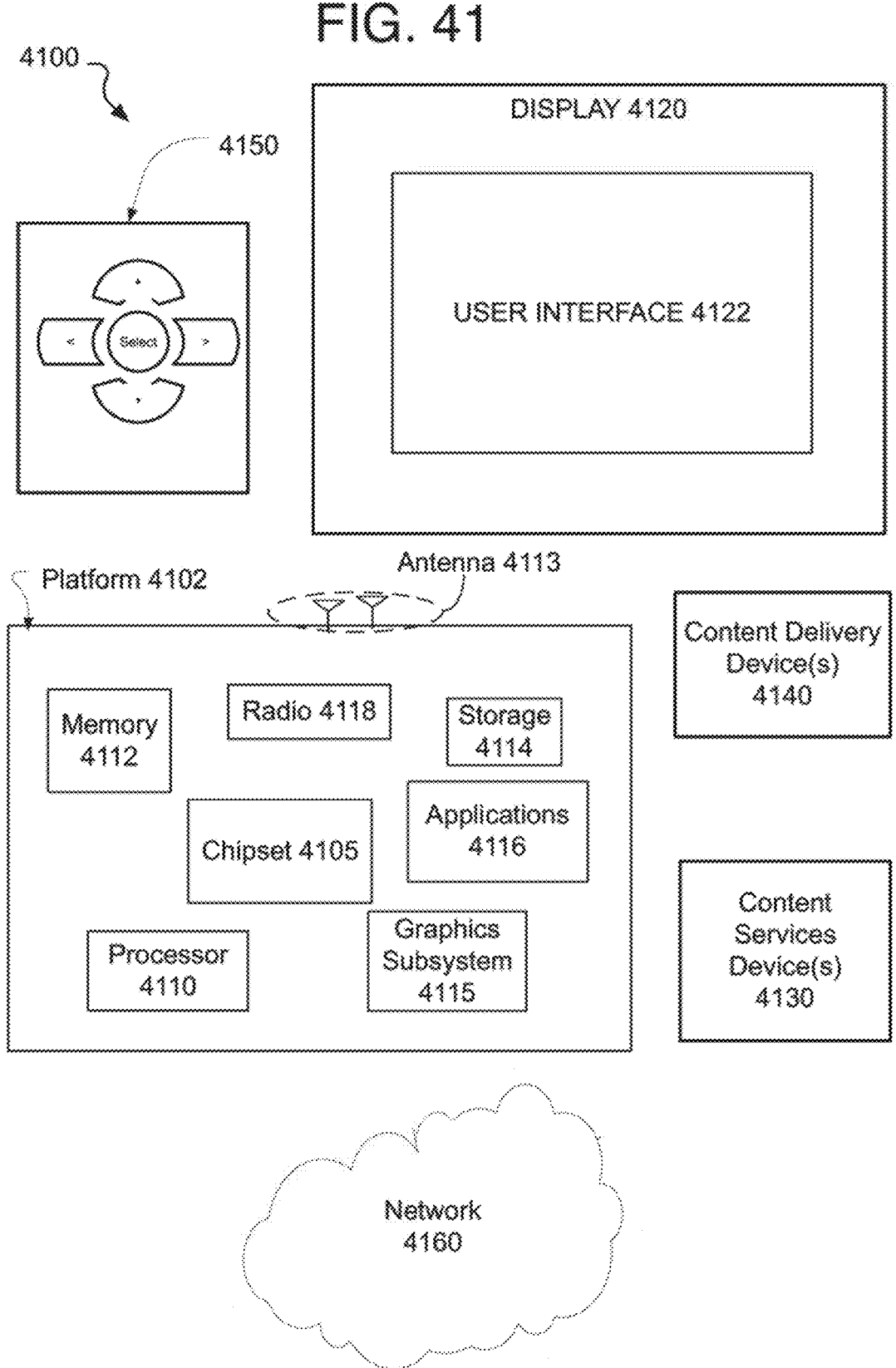

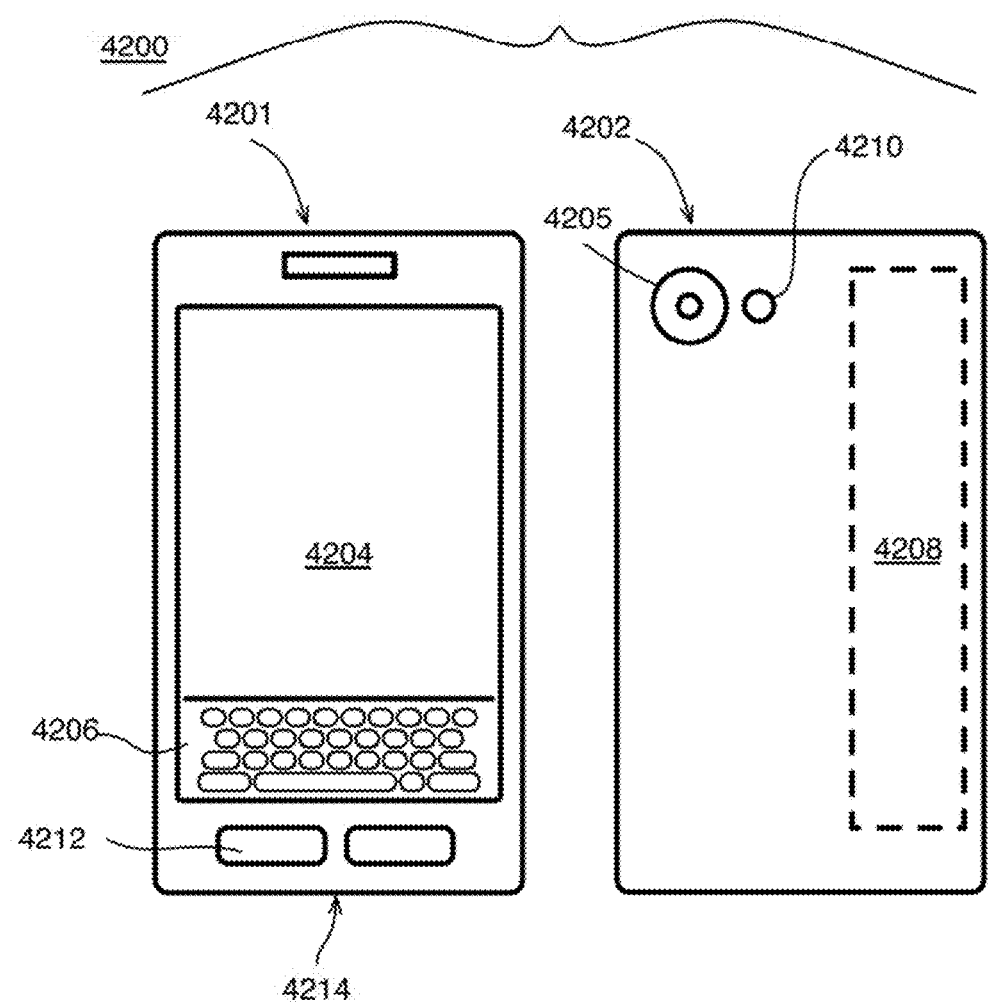

METHOD AND SYSTEM OF IMAGE DISTORTION CORRECTION FOR IMAGES CAPTURED BY USING A WIDE-ANGLE LENS

BACKGROUND

In digital cameras, wide-angle lenses may be used to capture a wide panoramic picture using a field of view (FOV) of 60 degrees or more for a usual wide-angle lens, and even over 180 degrees or more for ultra-wide angle lenses. The angles are centered at the focal point of the camera. Such lenses may be found on dedicated cameras, smartphones, digital security and surveillance (DSS) devices, vehicle cameras, and many other electronic devices with cameras. The wide-angle lenses initially provide a distorted image where objects on the image appear to have unrealistic shapes. For example, objects with flat surfaces appear curved and other objects have unusual warped shapes. These conventional wide-angle lens cameras have image processing units (IPUs) that correct the distortion in the images. Such camera IPUs balance a number of requirements while correcting the distortion. The distortion correction should be sufficiently accurate to provide a high quality image while also providing high performance so that the images can be provided in real time to meet video playback or transmission requirements, and all while performing such computations with relatively low power consumption so that the distortion correction can be performed on small devices with low power capacity. Conventional systems that perform the distortion correction, even with the use of hardware-accelerated solutions, may provide adequate performance and low power consumption, but often fail to provide a good quality image as well.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 is a schematic diagram of an undistorted corrected image showing the resulting pattern of image points of a conventional distortion correction method for a barrel distortion;

FIG. 6 is a schematic flow chart of a conventional lens distortion correction method;

FIG. 7 is a schematic diagram of an undistorted corrected image showing the resulting pattern of image points of both a conventional distortion correction method and a distortion correction method according to at least one of the implementations disclosed herein for a barrel distortion;

FIG. 8 is a schematic diagram of a close-up of the image point pattern of FIG. 7;

FIG. 9 is a graph showing the error between the image points of a homography lens distortion correction method and a conventional bilinear interpolation lens distortion correction;

FIG. 13 is a graphical diagram of a non-rectangular quadrilateral of an input distorted image to be rectified into a rectangle by homography;

FIG. 14 is the non-rectangular quadrilateral of an input distorted image divided into blocks;

FIG. 15 is a rectangular undistorted output image grid divided into blocks;

FIG. 18 is a schematic diagram of an image processing device to perform the methods of distortion correction for wide-angle lenses according to at least one of the implementations herein;

FIGS. 19A-19C is a flow chart illustrating an example detailed method of combined lens distortion correction (LDC) and homography distortion correction for wide-angle lens cameras according to at least one of the implementations disclosed herein;

FIG. 23 is a schematic diagram showing an input block of an input image formed with a 360 degree lens and having image points in spherical coordinates;

FIG. 24 is a schematic diagram showing a corrected dewarped output block grid with output blocks and having Cartesian coordinates according to at least one of the implementations herein;

FIG. 25 is a schematic diagram of a 360 degree input image to explain coordinate conversion according to at least one of the implementations herein;

FIG. 38 is a graph of maximum error per block for moustache distortion using a conventional method of distortion correction;

FIG. 39 is a graph of maximum error per block for moustache distortion using a method of distortion correction according to at least one of the implementations herein;

FIG. 41 is an illustrative diagram of an example system; and

FIG. 42 illustrates an example device, all arranged in accordance with at least some implementations of the present disclosure.

DETAILED DESCRIPTION

Figure 1:
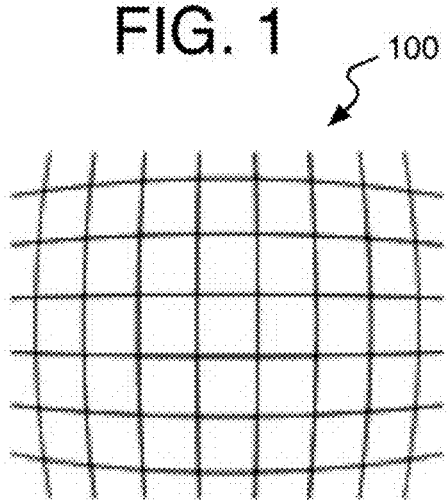
FIG. 1 is a schematic diagram of an input image with a barrel distortion.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes, including one or more image processing units (IPUs) that each use one or more image signal processors (ISPs). For instance, various architectures employing, for example, multiple integrated circuit (IC) chips and/or packages, and/or various computing devices and/or consumer electronic (CE) devices such as image capture devices, digital cameras, smart phones, webcams, video game panels, consoles, set top boxes, tablets, laptops, DSS systems, vehicle view and/or motion sensor systems, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, devices, systems, and articles are described herein related to image distortion correction for images captured by using a wide-angle lens.

Figure 2:
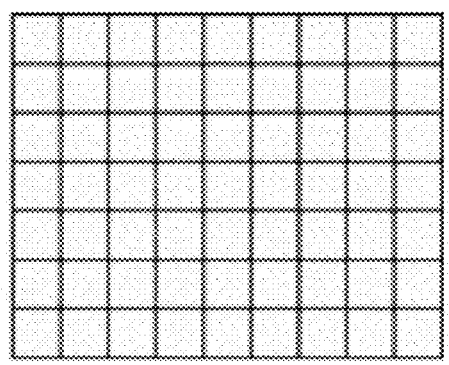
FIG. 2 is a schematic diagram of an output undistorted image correcting the image of FIG. 1.
Figure 3:
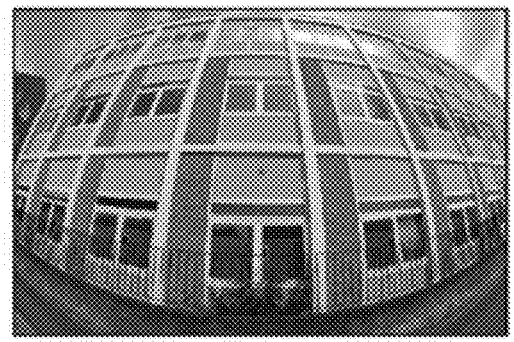
FIG. 3 is a picture of an input barrel distorted image.
Figure 4:
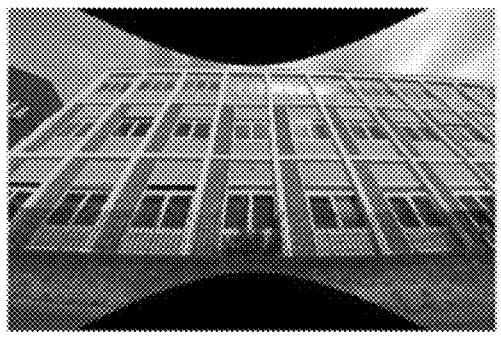
FIG. 4 is a picture of an output undistorted image correcting the input image of FIG. 3.

As described above, some digital cameras have wide-angle lenses to capture very wide panoramic images. Wide-angle herein is being used in a general sense providing a field of view angle of greater than 60 degrees, unless the context suggests otherwise, to include any camera lens that initially captures a distorted image due to the curvature of the lens and a relatively short focal point. Wide angle lenses with a field of view of about 60 to 180 degrees may be referred to herein as usual or common wide angle, and over about 180 degrees may be referred to as ultra-wide angle and may include cameras with fish-eye lenses, 360 degree camera lenses, and so forth. These lenses provide images with large geometric distortion that often need to be corrected in order to provide a realistic flat and/or rectangular image of a scene so that the objects in the scene look normal with realistic dimensions to a user viewing the scene or an automated system that uses the location of objects on the images to perform measurement such as depth. For example, an image 100 (FIG. 1) shown in a grid-form is an image captured from a camera using a wide-angle lens and resulting in a distorted barrel shape, while image 200 (FIG. 2) shows the undistorted and desired condition of image 100 in a grid form and that can be attained after distortion correction of the image 100. As can be seen on image 100, the pixel locations at intersections of the grid lines for example need to be moved to form the undistorted image 200. A picture of an input distorted image 300 (FIG. 3) in barrel distortion, and an output corrected and undistorted image 400 (FIG. 4) correcting image 300 are also shown.

Distortion magnitude is typically expressed in terms of so-called TV distortion, or standard mobile imaging architecture (SMIA) TV distortion. The typical requirements for the usual wide-angle lens cameras are to support at least 30-40% SMIA TV distortion up to 180 degree field of view (FOV), and 50% SMIA TV distortion for fish-eye type of lenses with views larger than 180 degrees. The SMIA percentage of distortion is measured by subtracting the height of the center of a distorted image (B) by the average of the left and right side heights of the distorted image (A), and then dividing this difference by (B): 100(A−B)/B. For high imaging quality, the required rectification for high accuracy is in the order of 0.1 pixel location difference between the distorted pixel location and the correct undistorted pixel location (simply referred to herein as 0.1 pixels).

Referring to FIG. 5, the conventional lens distortion correction (LDC) divides a block of pixels on the image into interpolation locations using piece-wise linear (Pwl) interpolation. The interpolated pixel locations (or more particularly, image points at pixel locations) are determined such that they are equidistant from each other, across all pixels lines, and across all pixel columns as shown on image 500 in the form of a global distortion correction map (or grid) with undistorted image points placed at pixel locations 502 (some example image points at the pixel locations have been darkened for clarity). Performing LDC this way introduces at least two errors within the block: curvature errors and homography errors.

Regarding curvature errors, when the distortion is even moderate, the conventional corrected and undistorted locations are already incorrect, as they do not follow the reduced but sustaining curvature of the pixel rows and columns from the distorted image that remains in the undistorted image. The true rows and columns in the undistorted image after correction are not necessarily perfectly linear. For example, an elevation of a rectangular cardboard box may have a distorted curvature in the distorted image. This refers to color and brightness values of image points for individual pixels that should be in pixels in a single linear row in a regular image but is now significantly curved in the wide-angle distorted image. Ideally in the corrected undistorted image, the box still may have lines of color and brightness image points that have a slight curve (and cross actual linear pixel grid location rows of a screen) so that the box looks realistic and linear to the human eye viewing the undistorted image on a display screen. When the conventional distortion correction forces the pixel data into equidistant linear pixel locations, rather than the natural slight curves, due to the conversion function and interpolation algorithms for instance, the box actually may look unrealistic and of low quality.

Referring to FIG. 6, one reason the curvature error occurs is due to the limitations of the distortion algorithm used to perform the piece wise linear interpolation and that cause the equidistant spacing of the image point locations. More specifically, a radii-ratio-based conventional lens distortion process 600 is provided to explain the curvature errors. A distorted input image 602 may be received, and here shown in a barrel distortion. Distortion conversion coefficients K0 and K1 may be obtained 604 and are pre-determined for an individual lens (or camera). The coefficients are then used in a conversion algorithm that presents the image distortion as radial distortion during a conversion operation 606. Radial distortion is a deformation of the image along the radial direction from a center of distortion 614 to the considered image point 616. This forms a radial distortion $R_d$ as shown on the distorted image 602.

The goal of the conversion is to determinate the function that can perform the mapping from the distorted image 602 to the undistorted image 608. One way is disclosed by Frederic Devernay, Olivier Faugeras, "*Straight lines have to be straight: automatic calibration and removal of distortion from scenes of structured environments*", Machine Vision and Applications, Springer Verlag, 2001, 13 (1), pp. 14-24, which suggests using a $3^{rd}$ order function as a mapping reference. This conventional method describes and quantifies the distortion, by defining the ratio between the distorted radius $R_d$ and a corresponding undistorted radius $R_u$ on the undistorted image 608 and that extends from the center of distortion 618 on the undistorted output grid (or image) 608, which is the same image location as the center of distortion 614 on the distorted image 602, and extending to the corresponding pixel grid location 620 that corresponds to the image point 616 on the distorted image 602. This may include a third order polynomial equation such as:

$$R_d = K0 \times R_u + K1 \times R_u^3 \qquad (1)$$

where given a particular $R_d$ for an image point on the distorted image, $R_u$ can be calculated to match the image point to a pixel location on the output undistorted grid (or image). The equation can be used to calculate image coordinates that indicate where on the distorted image to fetch pixel data for a current pixel location on the undistorted image to correct for the effect of the image distortion.

The desired accuracy, however, cannot be achieved by using the $3^{rd}$ order polynomial function, especially for distortion higher than about 15% SMIA TV. The available degrees of freedom to control the distortion curve are not sufficient. This is noticeable by experimenting with different types of distortions, including a moustache distortion. Using higher orders might improve this, but may result in complicated computations for matching an undistorted curve on the output grid to the actual distortion, and therefore implementation will be more costly because of the greater amount of required computations.

Referring to FIGS. 7-8 for example, the dashed rectangle 704 in an undistorted image 700 represents the bounding box of an object 702 by the conventional radii-ratio-based lens distortion correction approach, and the dots or image points (and pixel locations) represent the results of the present disclosed distortion correction LDC (without homography) methodology, which is very close to the actual, correct, or ground truth undistorted image point locations. An error is clearly visible where the curved image point rows of the pixels locations 706 are on the exterior of the box or object 702 as established by the conventional distortion correction method. FIG. 8 shows image 700 in close-up to more clearly show this error.

These figures are provided according to small or moderate distortion such as 10% of SMIA TV distortion. This rather small distortion of only 10% SMIA TV results in unacceptable error of 0.8 pixel (average), and 1.2 pixels (maximal error). When such distortion is large (~50% SMIA TV distortion), the error has been found to reach 4.8 pixels (average), and 7.2 pixels (maximal error) providing low.

In addition to the conventional radii-ratio-based LDC approach, adding more accurate homography transformation will raise the precision of the resulting undistorted images when such precision is required for a number of applications (this is referred to as the homography error above). Some applications need precise undistorted image point locations to provide a good quality image or result, such as stereo rectification and digital video stabilization (DVS) that may be performed in addition to the lens distortion correction. More specifically, stereo rectification is performed when a device has multiple cameras (RGB type and/or infra-red (IR) projector type to name a few examples) to measure depth. The images from the multiple cameras are rectified with each other, or in other words, the points on one image are matched to the points on one or more other images by use of algorithms such as triangulation and so forth. The rectified images then may be used to form a 3D space to locate and/or measure objects within that 3D space.

DVS which is one type of image stabilization (IS), and may be referred to as digital image stabilization (DIS) or electronic image stabilization (EIS), typically employs feature trackers to recover image-plane (2D) motion or to extract the underlying (3D) camera motion. A low-pass filter may be applied to the recovered motion, and a new video is generated by synthesizing frames along this smoothed path. DVS also may include buffering image data near and external to the outer boundaries of a camera frame to have image data ready in case of camera shake that inserts areas of image data in a frame (or image) that originally was outside of the frame. All of these techniques heavily rely on the precision of the undistorted corrected image data when a wide-angle lens is used to capture the image. As mentioned, LDC alone often fails to provide an image with sufficient high quality so that these applications can operate with a high level of accuracy or provide high quality images themselves. It should be noted that the terms frame, image, and picture are used interchangeably herein.

Compared to LDC, homography provides a different, more accurate distribution of the interpolation points and can achieve a true mathematical description of the geometric transformation between two planes (such as a distorted image or frame and a non-distorted image or frame). Thus, homography is a form of frame rectification. So if a camera is observing a planar surface, the converted undistorted image is additionally transformed by homography, and the resulting image should be so precise so that it can be used as another virtual viewing point of the surface, which is often performed with stereo cameras and DVS.

Homography transformation may be estimated in a number of ways. By one example, estimating homography may involve minimizing the sum of squared differences in pixel grid location between the image points on one image (the distorted image) and the candidate pixel locations on an undistorted image for example, and by using multiple degrees of freedom (or direction-related matrix) coefficients or parameters as described below.

Referring to FIG. 9, the error between conventional bilinear interpolation distortion correction and homography-based distortion correction is calculated and shown on a chart 900. The errors are expressed as distance in pixels between the required interpolation points and current bilinear interpolation points, assuming a 32×128 input image block, and the chart is based on an entire image of 512×512 divided into blocks of 32×128. The X and Y position of the axes are the pixel locations of the undistorted image. The errors resulting from the lack of homography support includes a range of error values up to about 2 pixels as shown. The resulting pattern shows that four 128 pixel wide blocks have the largest error in the middle block.

With regard to the hardware implementation during LDC, and for a number of computer functions, such as plug-and-play, real-time video viewing, and transmission on smartphones for example, both speed and low power consumption are also important. Some conventional IPU solutions, however, rely on the CPU for a substantial amount of the distortion correction computations, such as computing undistorted radii as described above, which raises overall SoC power consumption for example when SoCs host the IPUs. By one form, the performance requirement is to handle a 4K resolution image at a rate of 60 fps to provide real-time video, while it is expected that these requirements will increase dramatically in the future. When the previous solutions use image processing units (IPUs) that have a hardware block on a SoC that are reserved for performing image processing and distortion correction to achieve these goals, the power and speed requirements may be met but the image quality requirements still fall short.

To resolve these issues, the present wide-angle lens distortion correction methods provide: (a) high-accuracy to satisfy the demands for image quality, (b) high performance to satisfy the demands for pixel throughput, and (c) low power consumption that remains in a power envelope that small devices can sustain and to support reasonable battery life, thereby improving the functions of the computing device. The present distortion correction methods accurately, and in a hardware-efficient way, determine the positions of the pixels-to-be-interpolated. The interpolation used to perform distortion correction disclosed herein accurately follow the curvature of the actual physical distortion, and takes homography into account. The distortion correction systems and methods used herein are much more efficient than the conventional distortion correction methods, provide high image quality, and good performance for real-time implementations such as plug and play (PnP). Also, power capacity is significantly reduced as well by using predetermined radii-ratio look-up tables for LDC rather than using the CPU to compute undistorted radii and determine radii ratios for example. Combining the LDC methods and the homography in a single transformation as described below also beneficially reduces power consumption for those applications that need the precision of the homography. Lastly, this method also covers ultra-wide angle lenses such as fish-eye lenses and even 360-degree type of camera lenses by adding a stage that converts spherical to Cartesian coordinates as described below.

The present solution yields order of magnitude smaller error, both average, and maximal, compared to the existing solution. Images with a large distortion (~50% SMIA TV distortion) have been found to result in 0.0018 pixel (average), and 0.003 pixels (maximal error) with the method disclosed herein, while the existing solution results in the 4.8 pixel (average), and 7.2 pixels (maximal error) as mentioned above. For images with a small distortion (~10% SMIA TV distortion), the present solution results in 0.0003 pixel (average), and 0.0005 pixels (maximal error) with the method disclosed herein, while the existing solution results in the 0.8 pixel (average), and 1.2 pixels (maximal error) also mentioned above. Thus, the present solutions reduce the interpolation position errors to less than 0.1 pixels (average and maximum) while taking into account both the radii-ratio-based lens distortion correction and homography.

Figure 10A:
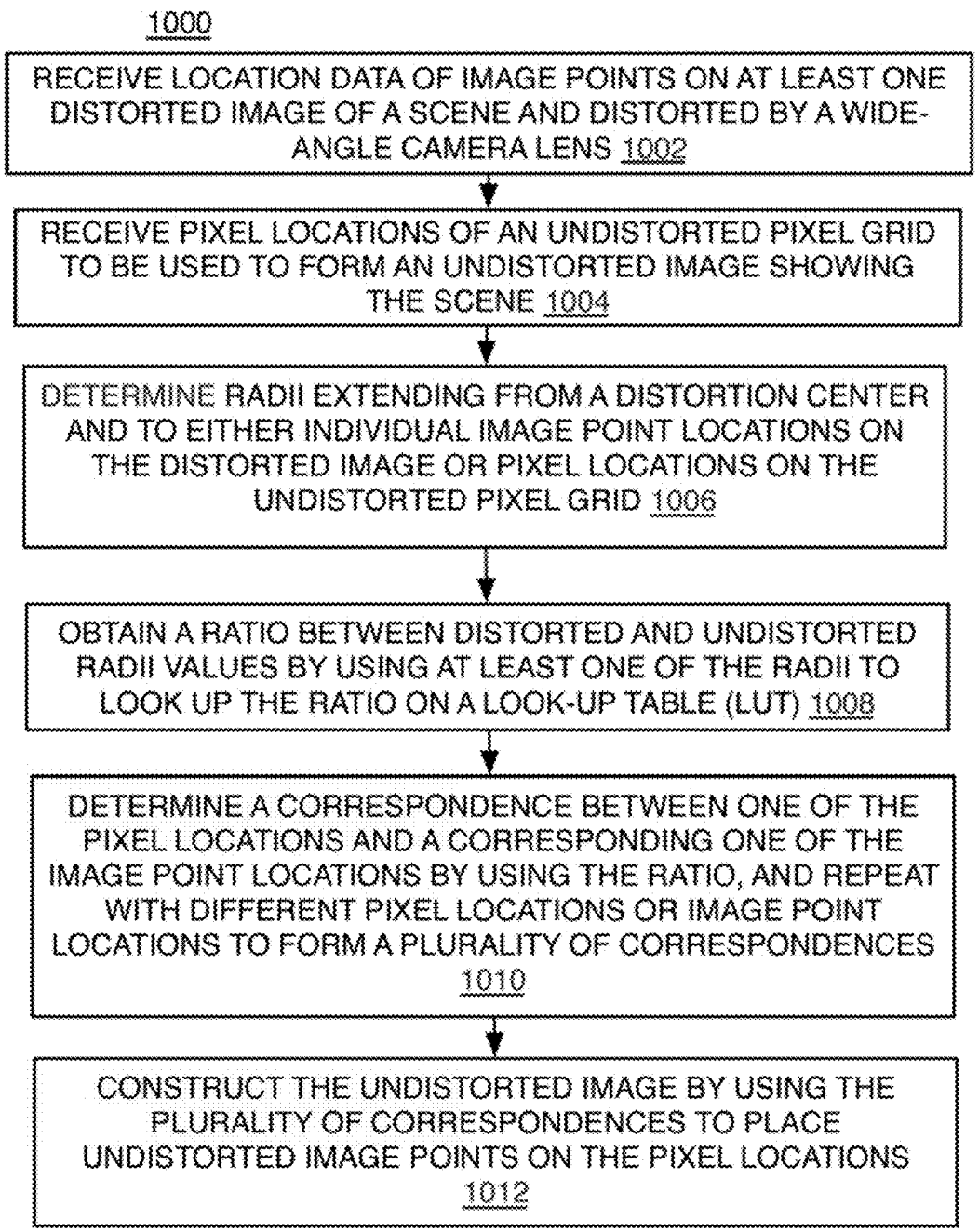
FIG. 10A is a flow chart illustrating an example method of distortion correction for wide-angle lens cameras that use a radii ratio look-up table according to at least one of the implementations disclosed herein.

Referring to FIG. 10A, an example process 1000 for image distortion correction for wide-angle lenses is arranged in accordance with at least some implementations of the present disclosure, and particularly for using a look-up table to determine radii ratios for lens distortion correction (LDC). Process 1000 may include one or more operations 1002 to 1012, numbered evenly. By way of non-limiting example, process 1000 may form at least part of an image distortion correction process for system 1800 and/or 4000 as discussed herein and where relevant.

Process 1000 may include "receive location data of image points on at least one distorted image of a scene and distorted by a wide-angle camera lens" 1002. This refers to image data of a scene distorted by using a wide angle lens, which may be the common wide angle lenses, or ultra-wide-angle, fisheye, 360 degree, and so forth as described herein. The location data may include locations of image points in the distorted image, and the data may be pre-processed at least sufficiently to perform distortion correction. By one form, the image data locations may be provided on a block-by-block basis such as by an area that covers 32×128 pixels of the distorted image.

Process 1000 may include "receive pixel locations of an undistorted pixel grid to be used to form an undistorted image showing the scene" 1004. The camera or system may have a pre-set undistorted pixel grid with known pixel locations that are to be matched to image point locations on the distorted image. By one form, these are provided in blocks such as 32×128 pixels.

Process 1000 may include "determine radii extending from a distortion center and to either individual image point locations on the distorted image or pixel locations on the undistorted pixel grid" 1006. Here, either the radii extend from a distortion center on the distorted image and extend to individual image point locations on the distorted image ($R_d$ as described above), or the radii extend from the distortion center projected onto the undistorted pixel grid and extending to pixel locations on the undistorted pixel grid ($R_u$ as described above). While the examples herein use $R_u$ as the independent variable, $R_d$ could be used instead.

Process 1000 may include "obtain a ratio between distorted and undistorted radii values by using at least one of the radii to look up the ratio on a look-up table (LUT)" 1008. Thus, when the LUT is set up to input $R_u$, the LUT outputs a ratio of $R_d$ to $R_u$ to be used in an equation to determine the correct $R_d$ components as detailed below. As mentioned, this could be the opposite way where $R_d$ is input to the LUT, and the output is a ratio of $R_u$ to $R_d$. By one form, the input to the LUT is the square of one of the radii in order to avoid mathematical iterative square root operations. To improve the accuracy of the LUT approximation, the curves also may be treated as close to quadratic.

Also, using the LUT and pre-determined radii ratios block by block permits a much more efficient use of hardware, such as a dedicated graphics processing unit (GPU) or image signal processor (ISP), since the hardware can be sized to handle computations performed on a block-by-block basis rather than the entire image to compute the best radii ratios as performed by the conventional LDC methods.

Process 1000 may include "determine a correspondence between one of the pixel locations and a corresponding one of the image point locations by using the ratio, and repeat with different pixel locations or image point locations to form a plurality of correspondences" 1010. Here, the radii ratios are applied, and the other resulting radius (whether $R_d$ or $R_u$) can be obtained, indicating the pixel location on the undistorted pixel grid corresponding to a particular image point location from the distorted image being analyzed. By one form, the correspondences are obtained separately in both a horizontal and vertical direction to provide 2D coordinates of the undistorted image point locations by using the ratio separately in two equations (one for the x direction, one for the y direction). With this arrangement, a scaling value can be applied to one of the equations when distortion distances are not the same in both the horizontal and vertical directions, such as when the distortion is more elliptical than circular for example.

By one approach, the computed image point locations are applied to sample points rather than all image points of a single image. These sample points may be considered anchor points, and the image points between the anchor points may be interpolated. The look-up table (LUT) may be first generated within a spline operation, and may include either the use of a parameterized model or by using images directly by determining reprojection errors described in detail below.

Process 1000 may include "construct the undistorted image by using the plurality of correspondences to place image data on the undistorted pixel locations" 1012. Thus, the undistorted image is reconstructed by placing the image data of the image points from the distorted image onto the undistorted pixel grid by using the multiple individual correspondences. More detail is provided below.

Figure 10B:
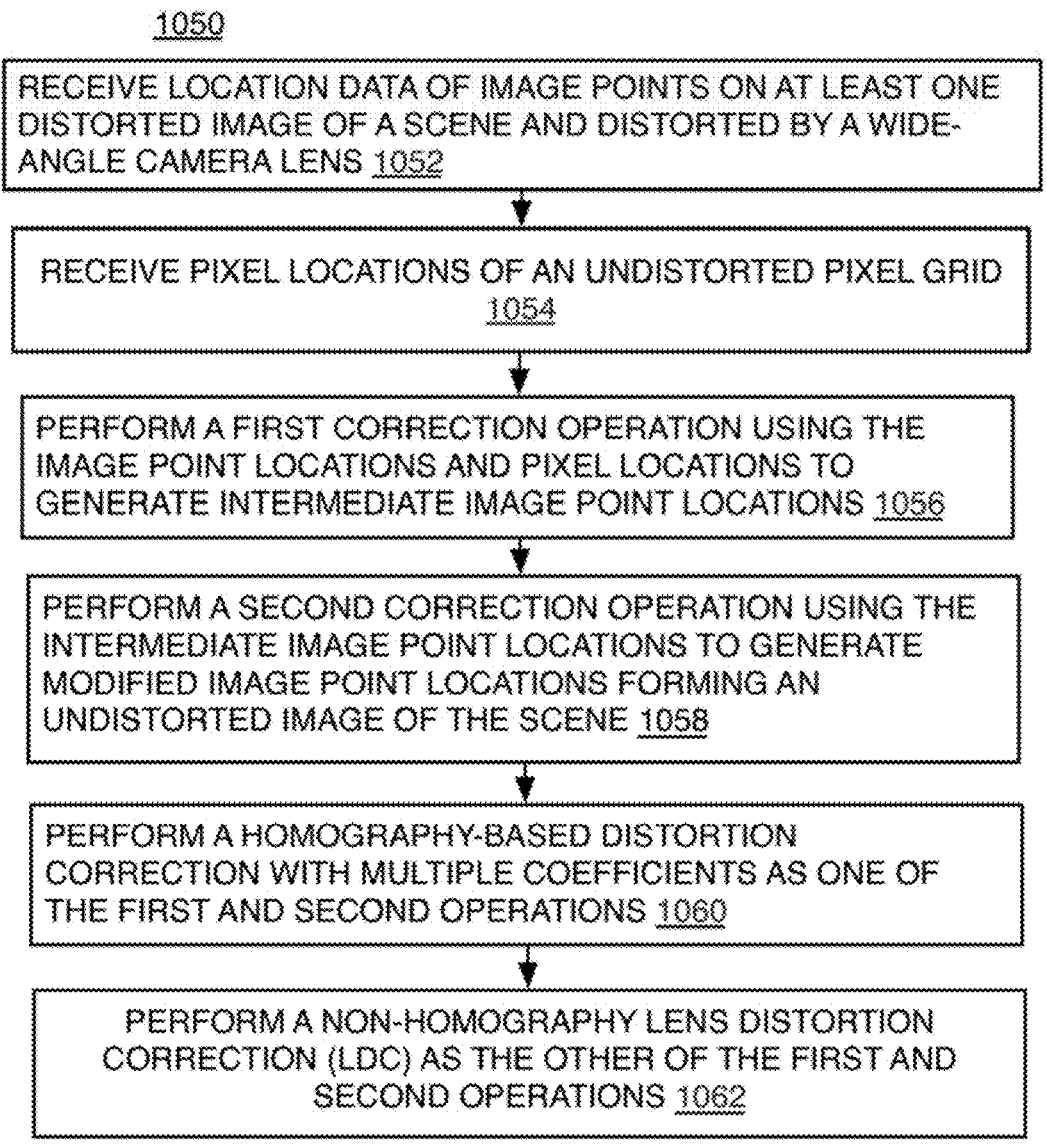
FIG. 10B is a flow chart illustrating an example method of distortion correction for wide-angle lens cameras that uses homography and non-homography lens distortion correction according to at least one of the implementations disclosed herein.

Referring to FIG. 10B, another approach is provided by an example process 1050 for image distortion correction for wide-angle lenses and is arranged in accordance with at least some implementations of the present disclosure, and particularly for combining homography with LDC operations. Process 1050 may include one or more operations 1052 to 1062, numbered evenly. By way of non-limiting example, process 1050 may form at least part of an image distortion correction process for system 1800 and/or 4000 as discussed herein and where relevant.

Process 1050 may include "receive location data of image points of at least one distorted image of a scene and distorted by a wide-angle camera lens" 1052, and this is as described with process 1000 and elsewhere herein.

Process 1050 may include "receive pixel locations of an undistorted pixel grid" 1054, also as described above with process 1000.

Process 1050 may include "perform a first correction operation using the image point locations and pixel locations to generate intermediate image point locations" 1056, and "perform a second correction operation using the intermediate image point locations to generate modified image point locations forming an undistorted image of the scene" 1058.

Thus, the first operation performs a preliminary or initial correspondence between the input distorted image point locations and the output undistorted pixel locations providing intermediate image point locations (or initial undistorted locations). The second operation applies a refinement to these intermediate locations to provide a more final correspondence between the image point locations and output pixel grid locations. These operations may or may not be consecutive so that there may be other intermediate refining distortion correction operations as well, or other operations may occur before or after these first and second operations, such that the recited first and second operations need not always be the only distortion correction operations and are not always consecutive.

To identify the specific type of distortion correction operations that may be performed as the first and second operations, process 1050 may include "perform a homography-based distortion correction with multiple coefficients as one of the first and second operations" 1060. This operation includes a homography rectification two images. Except here, instead of applying the homography to two different images form two different camera perspectives, the homography is applied to a single input distorted image and the output undistorted pixel grid. This involves the use of a 3×3 transformation matrix of coefficients for multiple degrees of freedom as described in detail below. The homography coefficients may be predetermined, such as during a calibration stage before normal use by the consumer, and determined for each particular wide-angle lens. Since multiple coefficients may be used that indicate different directions related to an assumed epipolar line between the distorted and undistorted images, this provides a much more accurate correction better maintaining the image points along ground truth curvature in the undistorted image.

Also, process 1050 may include "perform a non-homography lens distortion correction (LDC) on radii of the image point locations to a center of distortion on the distorted image as the other of the first and second operations" 1062, and which may include one or more of the LDC operations of process 1000 as described above. As mentioned, either the homography can be performed before the LDC operations or after. It does not matter which of the two is first and provides the initial undistorted image point locations as long as those locations from the first operation can be refined by the second operation of the other type of correction technique. By one form, the LDC may be a radii-ratio-based LDC, and by another form, the LDC uses a radii-ratio look-up table. This two-operation method can be made efficient by processing the data block-by-block while using the LUT for the LDC so that the processing can be performed by a non-CPU processor. The details are provided below.

LUT-Based Lens Distortion Correction (LDC)

Now in more detail, and as mentioned, the distortion correction may be improved by using look-up tables to determine radii ratios for radial-based and LUT-based LDC operations and by combining LDC with homography to further refine the matching of image points on the input distorted image to the pixel locations on the output undistorted image. These operations coupled with the efficient use of hardware significantly improves the quality of the images while providing good performance and low power consumption.

The LUT-based lens distortion correction (LDC) method may include a preliminary operation of generating and storing one or more look-up tables (LUTs) of radial (Rd/Ru) ratios to be used to compute undistorted image point locations on an output pixel grid. These ratios are stored in the LUT not only to reduce the total amount of computations to perform the LDC but also to eliminate the mathematical division operation thereby further reducing the bits required for obtaining the ratios for distortion correction computations. Furthermore, the LUT can be of a very limited size, in order to arrive to a hardware-efficient solution. By one example, the LUT may provide radii ratios for 32 to 512 points. In the implementations used herein, it has been found that an LUT range of 256 ratios is sufficient, and even the most extreme distortion curves are smooth at this level of detail. Relatively no abrupt changes from one point to the next one occur. It will be understood that the range in the LUT relates to a range in image or pixel distance from a center of distortion and along the radii. This represents a range of distances from the center of distortion. The range may be in pixel or sub-pixel (fractional or sub-pel) distances as desired. The bit depth of the input radii and LUT ratios may be between 16 and 32 bits. Both the LUT range and bit depth are moderate values leading to efficient lower bit implementations that can be handled by dedicated hardware, such as a GPU, ISP, and so forth, rather than a CPU of the system.

The LUT may be generated during a calibration stage for a particular camera or for a golden camera before being made available to consumers. Otherwise, such LUT may be transmitted or otherwise provided to consumers to initially install or update the LUT on the cameras. By other options, the LUT is held on a server or remote computer, and the camera communicates wirelessly or wired, to use the LUT to perform distortion correction. A number of LUTs can be made including one for each lens when a camera has multiple wide-angle lenses for example.

The LUT is generated by first determining a distortion curve ($R_d$ to $R_u$) or function based on number of anchor ratio points along the curve. Then, once the function or anchor ratio points are determined, the remaining ratios for the LUT may be interpolated from these such as by spline interpolation explained below. One example way to generate the anchor ratio points for the LUT is to use a parameterized model such as that disclosed by Zhang, Zhengyou, *A Flexible New Technique for Camera Calibration*, Technical Report MSR-TR-98-71, Microsoft Corp. (1998). A camera is used to capture multiple images of an object with known geometry, usually a grid of squares. The parameterized model is then used to minimize the distortion errors by calculating how an ideal camera would observe the object. This may involve selecting matching points in images and searching for geometric transformations that provide the best match between the locations of the points. The parameterized model provides the Rd/Ru ratio relations by providing a function with a set of parameters, and then the LUT can be filled in to minimize the difference, e.g., sum of absolute difference, between the function defined by the parameters and the values provided by the LUT, e.g., by the spline interpolation.

Another example way to generate the anchor points for the LUT is to refine the LUT using the images directly. The optimized quantity may be a "reprojection error". See Zhang cited above. This involves selecting matching points in images and searching for combination of LUT values and a 3D geometric transformation that provides the best match between the locations of the points.

As mentioned, one example approach to generating the remaining ratios for the LUT is through the use of spline interpolation. The spline may be defined as:

$$LUT\left(\frac{R_d}{R_u}\right)[N] = spline(R_u, R_d, N) \quad (2)$$

where $R_d$ and $R_u$ are defined as above, and N is the number of ratios provided in the LUT, and in turn, the range of the LUT. In order to determine the ratios to be placed in the LUT, the system runs on test images by inputting both Ru values and the ground truth Rd values. This may be performed on mathematical programs such as MATLAB working environments that allows a user to efficiently and quickly adjust the distortion curve parameters to the real distortion using the interpolation command. One approach was to introduce a few sliders, allowing control of the curve at different radial points. Once the distortion is corrected to satisfy the certain minimum parameters such as a maximum distortion from the true curve, the distortion curve is interpolated using the spline interpolation. Here ground truth is determined by setting N to an ultra-high precision of 1,000,000, and the first five input points of N to determine the ratios are as follows:

Input $R_u$: [0.00, 0.20, 0.50, 0.8, 1.00]
Input $R_d$: [0.00, 0.35, 0.65, 0.80, 0.85]
N=1,000,000

The input values shown above are determined by selecting points in images with known predicted ideal positions and searching for LUT values that best describe the ratio of the ideal and the observed point positions.

Figure 11:
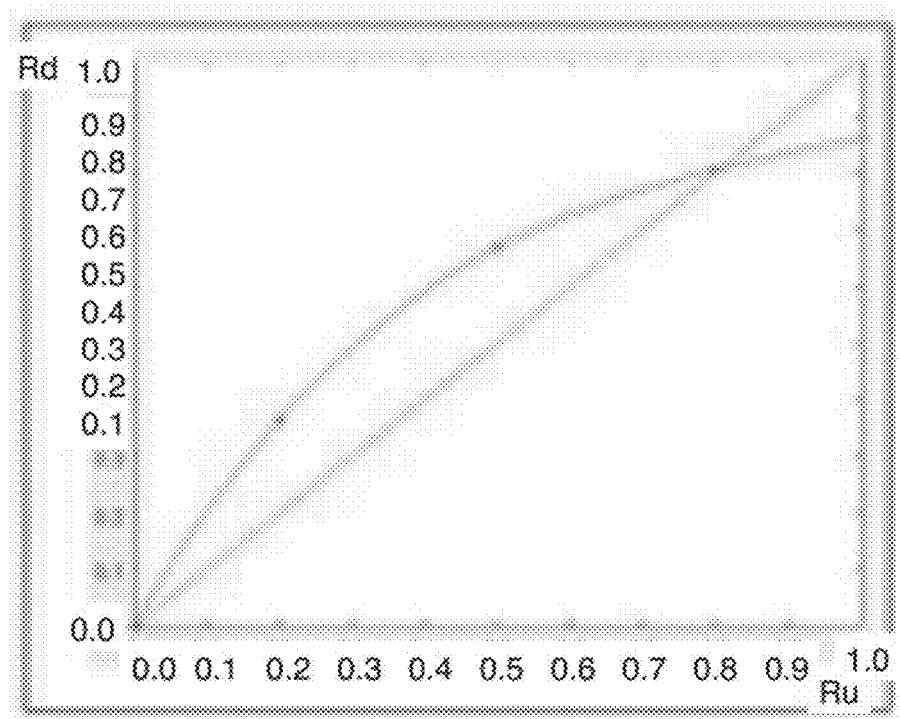
FIG. 11 is a graph showing spline interpolation of a distortion curve for forming radii ratios and resulting from application of at least one of the implementations described herein.

Referring to FIG. 11, chart 1100 shows the relationship of Ru to Rd, specified in only the five first points mentioned for the LUT and compared to simple conventional piece-wise linear interpolation to show the difference in distortion ratios that are computed. The remaining points of the distortion curve dependency of Rd/Ru are computed using ultra-high precision, at 1 million points, thus defining the ground truth of the distortion in the image. Also as mentioned, thereafter, N may be set to 256 for run time operations.

To perform LDC operations during normal-use run-time according to the implementations herein, the distortion correction system scans the output undistorted image (or more precisely, the undistorted pixel grid) and pixel location by pixel location in some set order such as raster scan order. For each output pixel location $(x_o, y_o)$ (where o refers to output), the undistorted radius, $R_u$, is computed. The challenge is to find a matching image point location $(x_i, y_i)$ (where i refers to input) at the input distorted image or pixel location grid for the distorted image, and matching the output pixel location $(x_o, y_o)$ being analyzed. Note that the pixel locations $(x_o, y_o)$ and $(x_i, y_i)$ are image locations measured from the upper left corner of the image for example, in contrast to (X, Y) coordinates that are distances from the center of distortion as explained below.

Once the $R_u$ is determined for individual pixel locations $(x_o, y_o)$, the $R_u$ is used to look up the radii ratio $(R_d/R_u)$ for that location on the LUT. The input pixel location $(x_i, y_i)$ is determined by multiplying the ratio Rd/Ru by the respective x, y coordinate at the output pixel grid location $(x_o, y_o)$ to determine the coordinates relative to the center of distortion as follows:

$$R_u = \sqrt{X_o^2 + Y_o^2} \quad (3)$$

where $R_u$ is the input to the LUT:

$$\frac{R_d}{R_u} = LUT(R_u) \quad (4)$$

and where $(X_o, Y_o)$ are the coordinate distances from the center of distortion $(X_c, Y_c)$ and to the pixel location $(x_o, y_o)$ of $(X_o, Y_o)$. Thus, $R_u$ and $R_d$ each may have two components, and $R_d$ may have its components determined separately by applying the radii ratio separately as with:

$$X_i = X_o \cdot \frac{R_d}{R_u} \quad (5)$$

$$Y_i = Y_o \cdot \frac{R_d}{R_u} \cdot Y_{const} \quad (6)$$

where $(X_i, Y_i)$ are the distance coordinates from the center of distortion on the input distorted image, which then can be converted to the image pixel coordinates $(x_i, y_i)$. This may be repeated n times, once for each ratio in the LUT and where n=0 to N−1.

By one approach, an additional scaling parameter may be used in equations (5) or (6) or both when the distortion is not the same in all directions from the center of distortion. Particularly, the distortion could be elliptical or some other shape, and not circular-concentric, and to accommodate that, an additional scaling factor may be multiplied by either the x component, the y component, or both. Here, the scaling factor is shown to be multiplied by the vertical domain, and is labeled $Y_{const}$ in equation (6) above.

By one approach, the efficiency of the implementation of the above formulas can be increased by removing the square root computation. This can be achieved if the independent variable input for the $R_d/R_u$, dependency is expressed as a function of $R_u^2$, instead of $R_u$, where:

$$R_u^2 = X_o^2 + Y_o^2 \quad (7)$$

$$R_d/R_u = LUT(R_u^2) \quad (8)$$

This approach, however, may result in the need to provide greater LUT capacity for larger address values, and in turn more bits per address, thereby requiring a deeper LUT to enable sufficient accuracy, such as with linear interpolation in between available LUT points. As an alternative, an efficient square root implementation may be possible by using an iterative approach to compute $R_u$, or other such approaches.

In the formulas above (equations (5) to (8) for example), it is assumed that the center of distortion $(X_c, Y_c)$ has already been factored in where necessary at (0, 0). However, when the center of distortion is not at (0, 0), this can be taken into account by subtracting the coordinate of the central pixel location at the center of distortion:

$$(X_o - X_c)^2 + (Y_o - Y_c)^2 \quad (9)$$

which is typically determined during camera calibration.

Figure 12:
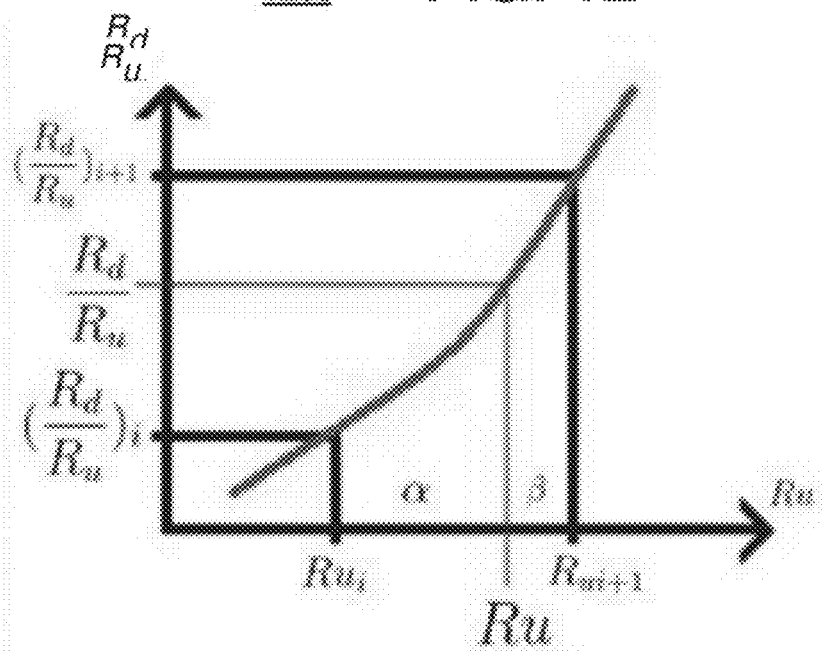
FIG. 12 is a diagram used to explain linear interpolation of radii ratios according to at least one of the implementations herein.

Referring to FIG. 12, one example way that the LUT is structured is to predetermine an $R_u$ or $R_u^2$ value for each of the N radii ratios (also referred to as the LUT points). These $R_u$ values at the LUT points may or may not be listed in the LUT. The indexing of the $R_u$ values may be omitted from the LUT when the $R_u$ values are assumed to be in a certain order and value relating to N radii ratios of the LUT points. When the actual input $R_u$ value does not match one of the predetermined N $R_u$ values at the LUT points, as will occur with many output pixel locations along the distortion curve between pixel locations that do have an $R_u$ corresponding to one of the N radii ratio values at the LUT points in the LUT, then the system may interpolate the radii ratio for the current $R_u$ from the radii ratios set for the N LUT points. Thus, for example, an $R_{ua}$ may be input to the LUT to obtain a radii ratio $(R_d/R_u)_a$, while an $R_{ua+1}$ may be input to the LUT and the output may be a radii ratio $(R_d/R_u)_{a+1}$ (where a is a counter variable so here a=n=0 to N-1). When it is desirable to obtain a radii ratio (and in turn an $R_d$) for an $R_u$ at a pixel location along the distortion curve that is between the pixel locations of $R_{ua}$ and $R_{ua+1}$. The interpolated radii ratio can be computed by:

$$\frac{R_d}{R_u} = \alpha \cdot \left(\frac{R_d}{R_u}\right)_{a+1} + \beta \cdot \left(\frac{R_d}{R_u}\right)_a \qquad (10)$$

where $\alpha$ is the difference between the desired $R_u$ and $R_{ua}$, and $\beta$ is the difference between the desired $R_u$ and $R_{ua+1}$. The interpolation may be performed by using dedicated or other hardware other than the CPU when possible, and by using simple linear interpolation by one example but could be formed with other interpolation algorithms such as bilinear. By one form, 8 bits precision for the LUT values is used for this linear interpolation, and the combination of the LUT with a range of 256 and linear interpolation at eight bits is found to have sufficient quality.

Once the radii ratios are obtained, and the ratios are used to determine matching input distortion coordinates $(X_i, Y_i)$ per equations (5) and (6) above for example and converted to $(x_i, y_i)$, the pixel values (for example the chroma and luma values) of the input image point $(x_i, y_i)$ may be assigned to the output pixel location $(x_o, y_o)$ based on the input pixel fetched at the provided location. Since the location of the input pixel may be given with fractional (sub-pel) precision, a sub-pel output pixel location can be computed using higher-order interpolation (like Lanczos3, or bi-cubic) in order to achieve a smooth output picture when necessary. This is represented by:

$$\text{OutputImage}(X_o, Y_o) = \text{Interpolate}(\text{InputImage}, X_i, Y_i) \qquad (11)$$

This is simply one example to accomplish fractional precision, and the technique used may be determined independently of the disclosed distortion correction approach. Other details of these LDC operations are provided below.

Homography

Homography is typically used on multiple camera stereo systems to register multiple images from different perspectives and to each other to form a 3D space or to create images of different perspectives of the same scene than the perspectives in the two registered images. Here, however, homography is being used in a very different way. Here, for the purposes of homography for distortion correction, blocks of image point locations on the distorted image can be treated as planar distorted shapes to be converted into regular shapes on the non-distorted image. By one example, the distorted shapes define a quadrilateral (or 2D tetragon or other shape) in the distorted image, and then homography is used to determine the output pixel grid locations (by transform matrix, linear interpolation, and other methods) to convert the tetragon into a rectangle on the output image. The distorted shapes form a unit or block on the distorted image. The shapes do not necessarily correspond to a planar object being shown on the image since the distortion relates to the wide-angle lens distortion, not the objects in the images by themselves. The homography may refine the position of the interpolation points either before or after the LDC is applied.

Referring to FIGS. 13-15, a preliminary global homography transformation is performed to determine homography coefficients (or parameters). The global homography is described by the set of parameters, and the parameters are used to transform the distorted shape into the normal undistorted shape, referred to herein as the homography rectification. For example, a selected input image area 1302 is defined by four points denoted G0, . . . , G3 on a section of an image 1300 (also shown as a distorted plane 1402 on an image 1400 (FIG. 14)), and the homography rectification will transform those points into a rectangular region 1502 on a section of an image 1500 (FIG. 15). The units shown on the images and used below are coordinates in a range of 0 to 1 merely for simplicity in this example here. An image may be divided into blocks, and each area or section may be one of these blocks for processing of these areas block by block when desired and as explained in greater detail below. Each block has different homography coefficients. Otherwise, a single homography could cover the entire image for example.

The global homography coefficients may be computed by using least squares by one example. The homography can be seen as:

$$p' = Hp \qquad (12)$$

where p' is the input distorted image, p is the output undistorted image, and H is a 3×3 homography transformation matrix (also directly referred to as the homography H) with eight degrees of freedom and may be computed by:

$$\begin{bmatrix} wx' \\ wy' \\ w \end{bmatrix} = \begin{bmatrix} h_1 & h_2 & h_3 \\ h_4 & h_5 & h_6 \\ h_7 & h_8 & 1 \end{bmatrix} \begin{bmatrix} x \\ y \\ 1 \end{bmatrix} \qquad (13)$$

where w is a weight determined as $w=h_7x+h_8y+1$, (x', y') is an image point on the distorted image p', and (x, y) is a matching or rectified pixel point on the undistorted pixel grid or image p and as described above. The homography coefficients $h_1$ to $h_8$ each relate to a different distortion correction direction (e.g., degree of freedom such as translation along a certain axis, rotation about a certain axis, etc.), and may be solved by using test images and least squares:

$$\min \|Ah-b\|^2 \qquad (14)$$

where h is a vector of the homography coefficients of H, A is a matrix with undistorted pixel location points (x', y'), and b is a vector of corresponding distorted image points (x, y). This may be performed to compute each of the homography coefficients $h_1$ to $h_8$. However, the homography coefficients could be computed in different ways by different applications such as digital video stabilization (DVS) homography, or others. A detailed explanation of one example computation of the homography coefficients can be found in Hartley and Zisserman, *Multiple View Geometry in computer vision*, Chap. 4, Cambridge Univ. Press (2003); and *Computational Photography and Introduction to Computer Vision class*, Lecture 10, Homographies, Mosaics and Panoramas, MIT, (2008).

Once the homography coefficients $h_1$ to $h_8$ are set, these coefficients can then be used going forward to correct distortion for the particular block or blocks for the associated camera and lens being used, and depending on the application. For instance, the coefficients can be modified by uploading new coefficients when the camera moves or a new virtual view is desired in virtual view applications. With a stereo camera application, the coefficients may be updated when the system needs to be recalibrated. With a DVS application, the coefficients may be updated with every move of the camera. It also is possible to split an image in parts and have different homography transformation for each part of an image. This is typically done in DVS applications where homography in parts is used to approximate a more complex image and/or where (de)warping operations are needed for rolling shutter camera distortions.

The relation between the coordinates of the image points in a distorted input image $x_i$ and $y_i$, and the coordinates in the rectified and undistorted (output pixel grid) image with pixel locations $x_o$ and $y_o$, then can be written as:

$$x_m = x_i = \frac{h_1 x_o + h_2 y_o + h_3}{h_7 x_o + h_8 y_o + 1} \quad (15)$$

$$y_m = y_i = \frac{h_4 x_o + h_5 y_o + h_6}{h_7 x_o + h_8 y_o + 1} \quad (16)$$

When the homography is performed before the LDC as described in detail below, these resulting image points ($x_i$, $y_i$) can be referred to as interpolation points (since they will correspond to LDC interpolated input image point locations) or intermediate points ($x_m$, $y_m$) where $x_i = x_m$ and $y_i = y_m$ to then be used to form the undistorted ($R_u$) input to the LDC computations, as explained in detail below. 'm' is used herein to avoid confusion and may stand for modified or middle. Equations (15) and (16) also may be referred to as the homography coefficient equations.

It also will be appreciated that these operations may be referred to as an inverse homography since the input to the homography coefficient equations (15) and (16) is the output pixel locations, and the result is the intermediate image point locations ($x_m$, $y_m$) or input image point locations. The intermediate points then can be refined by non-homography LDC. By other alternatives, forward homography could be used instead.

Figure 16:
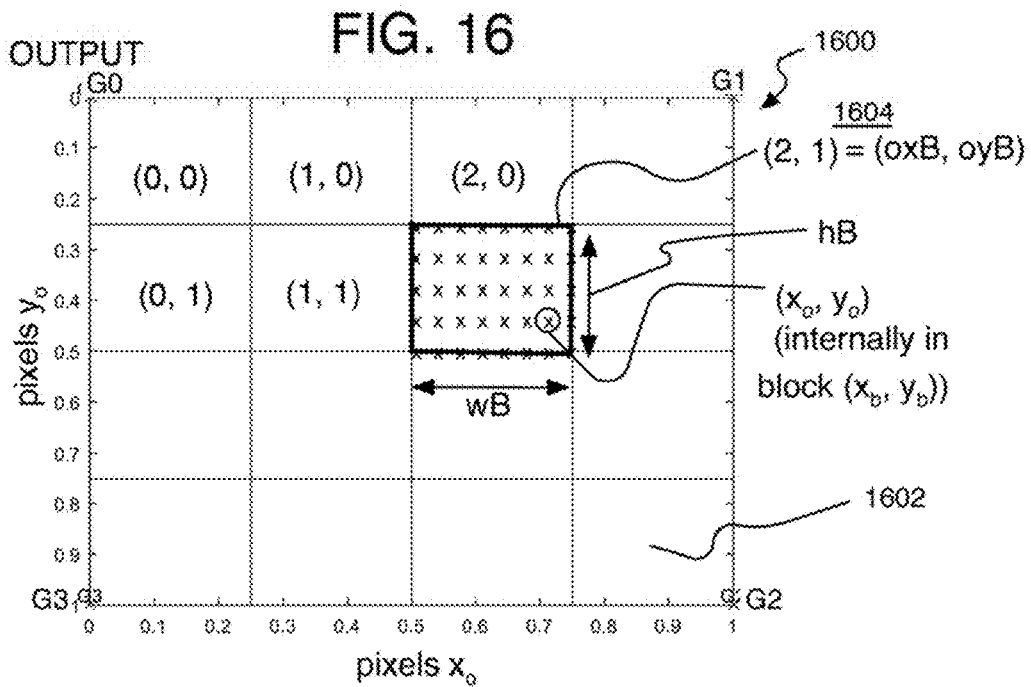
FIG. 16 is schematic diagram of a part of an output image divided into blocks and showing pixel locations within a block.
Figure 17:
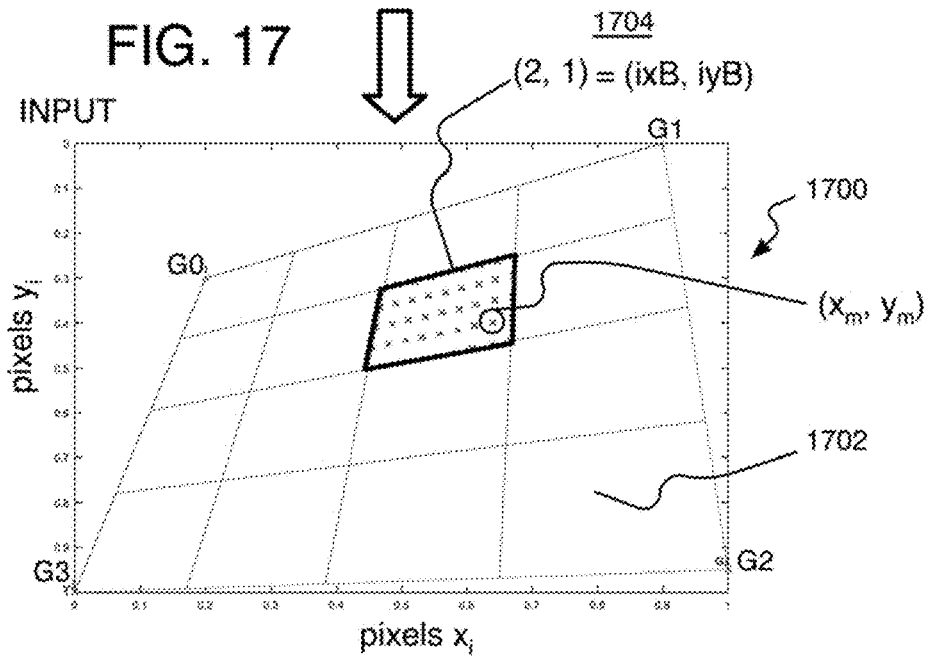
FIG. 17 is a schematic diagram of a part of a distorted input image divided into blocks and showing interpolated locations within a block.

Referring again to FIGS. 14-15 and now FIGS. 16-17 as well, by one form, the homography is applied block by block. For illustration purposes, an output image 1500 or 1600 is divided into 4×4 equal image blocks 1502 or 1602 respectively. The resulting input image blocks shown on input (or intermediate) image 1700 (FIG. 17) has intermediate points or interpolated points determined by some logical order, such as raster order, although other orders are possible. The details of distortion correction in a block by block process that combines homography with LUT-based LDC are provided below.

As mentioned above, while LUT-based LDC improves efficiency by reducing the use of the CPU due to the addition of the LUT, combining the LUT-based LDC with homography provides a rectified image that increases the quality of the distortion corrected image. The LDC can come before or after the homography as long as the second method further refines the results of the first method. The example below of combined processes 1800 and 1900 provide the homography before the LDC.

Referring to FIG. 18, an example image processing device or system 1800 is provided to implement the image distortion correction, arranged in accordance with at least some implementations of the present disclosure, and shows alternative pipelines to perform these operations on alternative lens types. In one form, image processing device 1800 is an imaging device or camera or has at least one camera, and may be a smartphone with a single type of camera lens, or may be or have a single camera with alternative lenses, or may be a device with multiple cameras each with a different lens. By other approaches, the image processing device 1800 may not have a camera and may perform the processing for the camera such as a wirelessly communicating server that communicates over a WAN such as the internet.

The system 1800 shows the initial order of functional units in alternative pipelines for both common wide-angle lens images with an FOV 60 to 180 degrees on one pipeline branch, and ultra wide-angle, fisheye, or (360 degree) type of images with a FOV from 180 to 360 degrees on another pipeline branch. The two pipelines use different operational units. In the case of common wide-angle lens images, a distorted input image 1802 is provided to a homography unit 1806 that performs image rectification to refine the image point locations on the output pixel grid to form a rectangular or flat image 1808 with intermediate image points. Then, a LDC unit 1810 may perform a further correction of the intermediate image point locations relative to an output undistorted pixel grid or image 1812. This may involve the use of the LUT to provide radial ratios to perform the correction as described herein.

Alternatively in case of ultra-wide angle lenses such as a 360 degree images, a distorted input image 1804 may be provided to the homography unit 1806 and may be used as with the other wide angle lens images to provide a flat image 1814. Except now, a dewarping unit 1816 then unwarps (or visually speaking, unwraps) the image to form a flat output pixel grid or image 1818.

Of course, the ultra-wide angle lenses, when provided in Cartesian coordinates, could be processed using the LDC instead of the dewarping. Otherwise, it will be understood that the order of the units as shown on system 1800 is merely one example and other orders may be used as well. For example, the LDC unit and dewarping units may perform operations before the homography instead of after the homography as shown. Also, LDC could be applied to an image in addition to the dewarping.

By one form, the device 1800 provides a single pipeline architecture structured to enable and/or disable each unit separately to perform the alternative pipelines. For example, dewarping is turned off when common wide-angle lens distortion is being corrected, while LDC is turned off for ultra-wide lens image correction. This can be accomplished by using a different function that maps the pixels in the output image but still uses the LUT for radial dimension transformation.

For the LDC, since the LDC includes primary focus on pixel location interpolation based on the LUT, simple linear interpolation, iterative square root computation or square diameter $R_u$ look up, and multiplying by the $X_o$ and $Y_o$ coordinates, the added complexity to the hardware is extremely low. Thus, the processing may be sufficiently provided by a GPU or ISP with a dedicated or shared geometric distortion correction (GDC) block or circuit (referred to herein as the GDC hardware), which may or may not be part of a SoC.

Also as mentioned above, the same dedicated GDC circuit can be used for homography, except for the computations to generate the homography coefficients in the first place which may be performed by the CPU instead.

The dewarping may be performed block by block by the GDC hardware as well or could be performed by the CPU. As to the increase in memory, the added cost due to the interpolation and LUT will be the 16-bit or 32-bit wide LUT of 256 depth by one example, and in total, one memory bank of 1 KB capacity.

Comparing the above hardware elements mentioned above to be added to an existing system, the additional area would be negligible. One example existing system that performs image processing and wide angle distortion correction may already include a memory subsystem of 8 KB, based on multiple memory banks, register file system of ~150 registers, dual-read, dual write LUT for coefficients, consisting of eight memory banks, each being 256 deep and 72 bits wide, four identical MAC trees capable of producing four pixels in parallel, each computed using Lanczos3 interpolation method (6*6 filter footprint, 36 MAC operations per pixel, 144 in total), plus additional pipeline stages, and many FSM's controlling the entire design. Such architecture is typically used for image processing to display images, perform compression, and so forth.

Figure 19B:
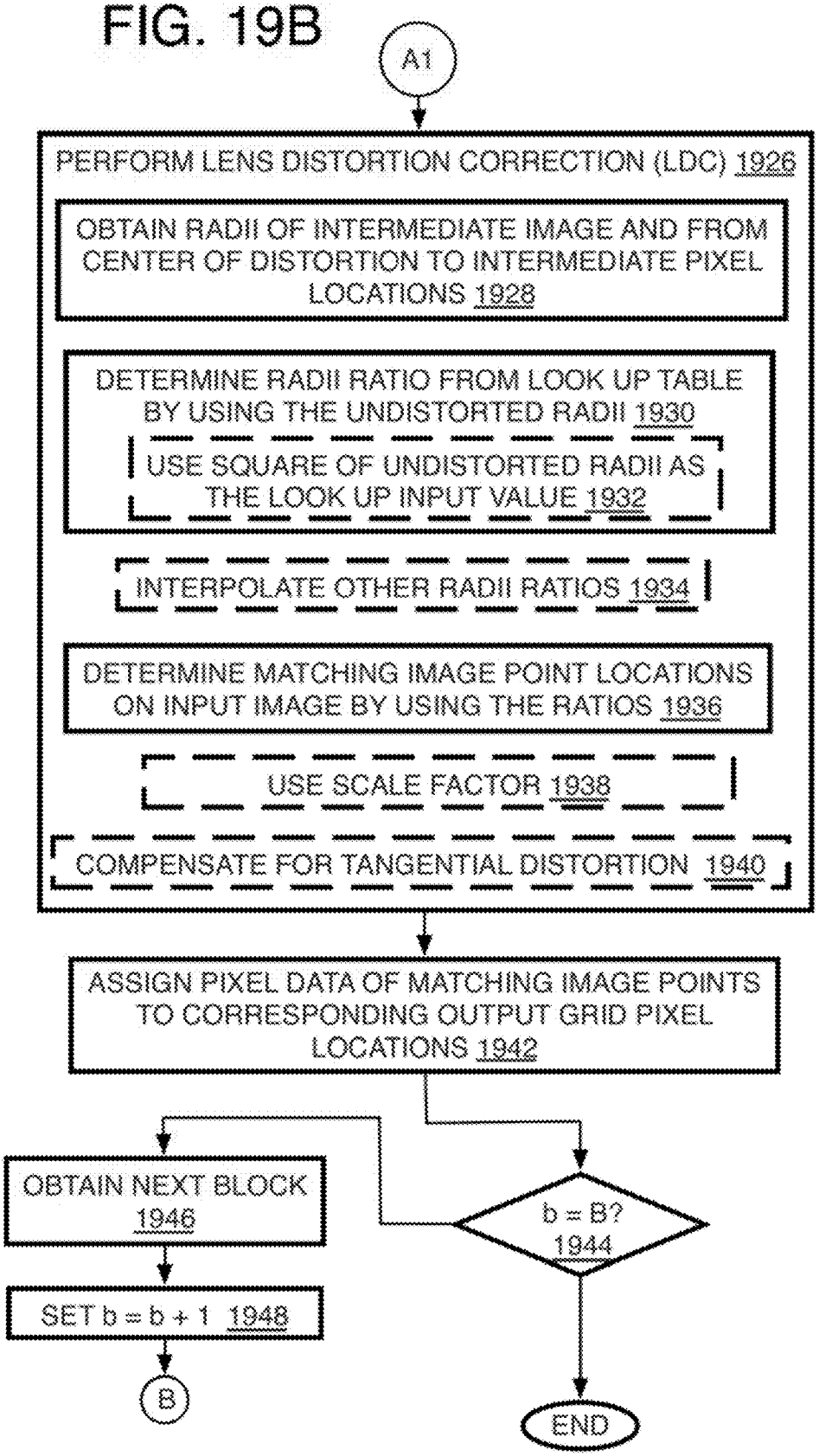
Figure 19C:
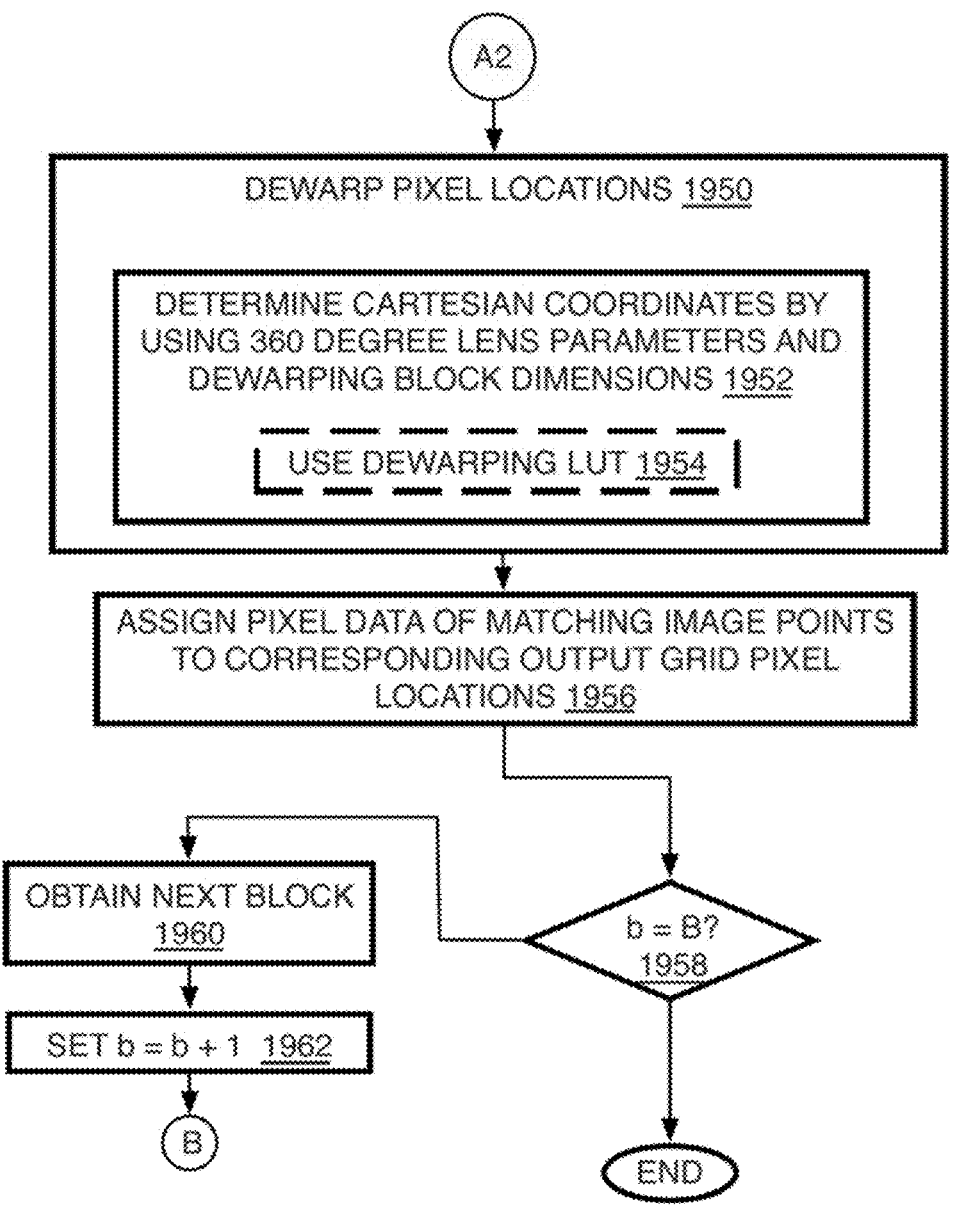

Referring now to FIGS. 19A-19C, an example process 1900 for image distortion correction is arranged in accordance with at least some implementations of the present disclosure. Process 1900 may include one or more operations 1902 to 1962, generally numbered evenly. By way of non-limiting example, process 1900 may form at least part of an image distortion correction process for imaging device or system 1800 and 4000 as discussed herein and where relevant.

Process 1900 may include "obtain wide-angle lens camera image(s)" 1902. The images may be in the form of raw sensor data from a camera, and may be common wide-angle lens images (from 60 to 180 degree FOV) or ultra-wide angle lens images (from 180 to 360 degree images).

Process 1900 may include "pre-process image at least sufficiently for distortion correction" 1904. Whether by the camera or other system, the images may be processed at least sufficiently to perform the distortion correction. This may involve demosaicing, noise reduction, and so forth. Otherwise, it could be combined with demosaicing where the interpolation tasks of demosaicing may be shared with the distortion correction operations. Alternatively, the methods herein could be performed on the raw data as well as long as the LUT and homography coefficients are available.

Process 1900 may include "define blocks to be corrected in image" 1906. Efficient GDC hardware implementation of the block can be achieved by generating the output image block by block. This allows efficient memory management and reduces the area of the hardware required to perform the distortion correction because the hardware can be sized to process one block at a time. The block, however, cannot be too small because the overhead for the GDC hardware computations for each block becomes too large in total. In other words, each block has an overhead that initiates certain tasks such as certain handling for border pixels where blocks start and end. When the blocks are too small, there are too many overhead operations and data transfers to perform, which could overwhelm the system. It has been found that the smallest block should be about 32 pixels high by about 128 pixels wide. Therefore, the examples herein use the 32×128 blocks.

To reduce power consumption and maintain high performance, the homography and LDC should be performed in a single pass enabled by using an LUT rather than iteratively calculating radii ratios. Merging these two functions, or transformations, into a single process may be achieved by transformation into coordinates that can be used by both processes. This includes the following operations to provide coordinates and track the blocks through the processes.

Process 1900 may include "set current block b=0 of image blocks 0 to B to be corrected" 1908. This is simply to set a block counter for the image being analyzed and is one example technique, while many others are possible when the counter may or may not relate directly to the value of the coordinates of the blocks.

Process 1900 may include "obtain output undistorted pixel grid locations" 1910. Thus, the system may inform the GDC hardware of the coordinates of the current output pixel grid block to be processed to generate the undistorted image data for the block. The knowledge about the current output image position can be kept as an internal state if the output image blocks are generated in some predefined order, such as raster order on the output grid or image. The coordinates also can be supplied as input to the GDC hardware every time the GDC hardware starts to process a new output image block.

Referring again to FIGS. 16-17, the 2D position of the current output block may be denoted by oxB and oyB, where o stands for output. For example, the top left output block is at location oxB=0, oyB=0, and the coordinates increase from left to right and from top to bottom of the output image as shown on output image 1600. The width of the output image block is wB and the height is hB. The internal output image block coordinates are denoted by $x_b \in [0, wB]$ and $y_b \in [0, hB]$ where the upper left corner of the block defines pixel or image point $(x_b, y_b)=(0, 0)$.

Then, the output coordinates of the pixel grid location (or output image point) in the output image block at block position oxB and oyB are calculated as:

$$x_o = x_b + oxB * wB \quad (17)$$

$$y_o = y_b + oyB * hB \quad (18)$$

where the $x_o$ and $y_o$ are the output pixel grid or image coordinates that can be calculated based on the known oxB and oyB output block position and the internal block coordinates $(x_b, y_b)$ of the pixel grid point $(x_o, y_o)$. For illustration, an example output block 1604 at oxB=2 and oyB=1 is shown on image 1600 where the block 1604 has 4×8 pixels (shown as an 'x'). For this operation then, the GDC hardware may be triggered to produce a block at (oxB, oyB), with the output block size of (oxdim, oydim).

The output pixel grid points $(x_b, y_b)$ and block locations may be set at whole pixel locations (rather than sub-pel locations), and may be every pixel location or some uniform sampling of the total pixels. Otherwise, the output pixel grid points and/or block locations could be set at sub-pel locations instead or in addition to the whole pixel locations. The number of pixels will depend on the resolution of the images.

Homography is then applied to generate a corresponding block 1704 of input image points (also referred to as intermediate points or interpolation points) on the distorted image 1700. Specifically, by one approach, the homography actually operates in an inverse mode where the output undistorted pixel grid locations are obtained, and these locations are then used by applying homography to form intermediate distorted image point locations $(x_m, y_m)$ by equations (15) and (16) described above. The calculated homography intermediate points $(x_m, y_m)$ for the block 1704 are also indicated at locations each designated by an 'x' in block 1704 of image 1700.

In more detail, process 1900 may include "perform homography to modify the distorted pixel location" 1912. The operation of the homography initially may include having the process 1900 "determine global homography mapping of distorted image to rectified output image" 1914. This refers to process 1900 operating to "determine homography coefficients" 1916.

This may refer to obtaining predetermined homography coefficients (or parameters) that were already generated by fetching them from a memory. The homography coefficients may be generated in a preliminary operation using test images on the lens to have the homography coefficients as described in detail above. Also as mentioned above, such global homography transformation generating the homography coefficients may be calculated externally to the GDC hardware, for example, on the CPU which is present to perform other image processing tasks anyway, such as with DVS. Otherwise, the remaining homography operations may be performed by the GDC hardware.

Also, in some applications such as DVS, a few different homographies may exist per single frame. This might be used, for example, for complex rolling shutter distortions cases where parts of the frame will have different homographies. To support this, only the regions of a frame that are to be distortion corrected need to be specified. These regions then may be divided into blocks as described above. Thus, the blocks are not necessarily all adjacent to each other. In these cases with multiple homographies on a single frame, each homography can be supplied to the GDC hardware, either (1) all during an initialization stage, or (2) each time a block is used; the homography coefficients assigned to that block are looked up and fetched so that each block may be initialized with a different set of parameters when available. While the first option may have less complicated software design since less communication between the GDC hardware and a controller processor may be needed, the second option may be more suitable for hardware implementation since it requires less memory capacity and allows uninterrupted intra-frame flow while processing of a single block.

Process 1900 may include "store homography coefficients locally and accessible to non-CPU image processing hardware" 1918, and refers to storing the global homography parameters into the GDC hardware for the current block being corrected. The eight parameters each indicated by a coefficient $h_1, \ldots, h_8$ that are used for defining a homography transformation matrix (equation 13 above), may be stored in one or more on-board local registers, ram, or input buffers accessible to the GDC hardware for example. This may occur during an initialization stage as mentioned above, or while other corresponding block data is being fetched as the blocks are fetched block by block. Thus, the GDC hardware's local input buffer may be filled by the input data that is to be used to produce the output block located at (oxB, oyB) location at the output block grid.

Figure 20:
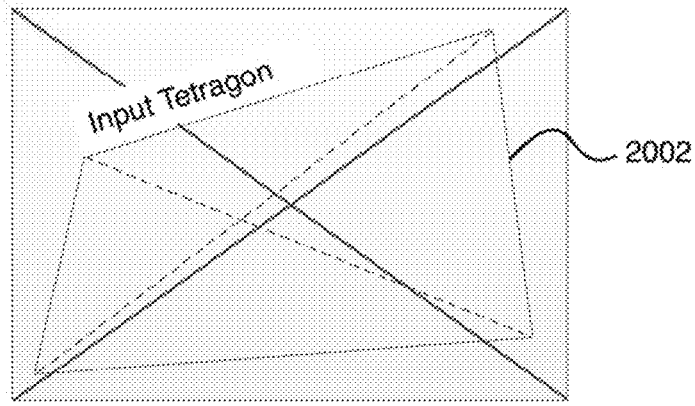
FIG. 20 is a schematic diagram of an output block and an input tetragon overlaid on the output block to explain an example of a combined lens distortion correction (LDC) and homography method of distortion correction according to at least one of the implementations herein.

Referring to FIG. 20, process 1900 may include "generate local intermediate image points" 1920. Here, the system, or GDC hardware when used, analyzes each or individual output pixel grid locations $(x_o, y_o)$ within the current output pixel grid block (oxB, oyB) being analyzed. The homography (or homography function) is applied in the inverse to calculate the intermediate distorted coordinates $(x_m, y_m)$ for distorted image points using the homography coefficient equations (15) and (16) recited above. This stage is exemplified by an output block 2000 which would include the output pixel grid points $(x_o, y_o)$ with an overlay of the resulting input distorted quadrilateral or here tetragon 2002 that correspond or match to the output pixel grid points $(x_o, y_o)$. The homography is considered in the inverse here since the input to the homography coefficient equations (15) and (16) are the output pixel grid points and the result is the distorted input image point locations. As mentioned, the system may analyze each pixel grid point or some reduced sampling of the points at uniform intervals for example.

Also, operations applying homography coefficient equations (15) and (16) can be made even more efficient by reducing hardware computations by using a local point calculation that takes advantage of the pixel grid layout and neighboring positions of the pixels. In other words, since the local block (oxB, oyB) represents a regular grid and the pixel grid locations $(x_o, y_o)$ have uniform spacing within the block, the homography coefficient equations can be implemented by simpler additions. For example, if $h_c x_o$ is calculated, then the next right pixel coordinate is $h_c(x_o+1)=h_c x_o + h_{co}$ where $h_{co}$ is one of the homography coefficients (or parameters) $h_1$ to $h_8$. Initial values for each factor $h_c x_o$ and $h_c y_o$ can be calculated during initialization, and each new value calculated from it by adding appropriate offsets.

Optionally, process 1900 may include "apply scaling factor" 1922. By one example, the formulas for local computation with a scaling factor can be written as:

$$s = \frac{1}{h_7 x_o + h_8 y_o + 1} \tag{19}$$

$$x_m = s*(h_1 x_o + h_2 y_o + h_3) \tag{20}$$

$$y_m = s*(h_4 x_o + h_5 y_o + h_6) \tag{21}$$

This is used to avoid a computation heavy division calculation and places the denominator of the coefficient equations into the scaling factor. The scaling factor calculation can be implemented in various ways in hardware. One is to use a look-up table to perform the division where the look-up table has values for function 1/D for equation (19) for example, where the denominator D of equation (19) is computed and then used as an input to the look-up table to obtain 1/D, and this may be performed within a spline interpolation operation for this as well. An iterative implementation is another option to iterate conventional mathematical division operations typically implemented in hardware as a machine that needs to run for a few clock cycles to achieve a certain desired precision.

Figure 21:
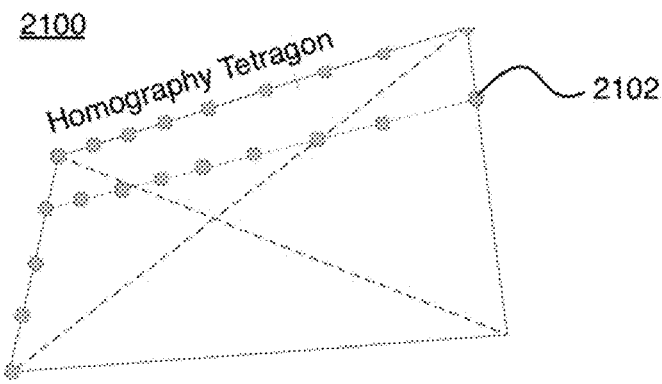
FIG. 21 is a diagram showing intermediate image point locations matching the pixel locations of the output block of FIG. 20 and due to homography according to at least one of the implementations herein.

Referring to FIG. 21, the result is an intermediate distorted homography tetragon 2100 with intermediate image points $(x_m, y_m)$ 2102 that will correspond to interpolated points 2202 on the final input distorted block or curved iteration 2200. An image holding a number of these tetragons may be referred to as the intermediate image (for tetragon blocks 2100) and input distorted images (for curved tetragon blocks 2200) respectively.

Process 1900 then may include "provide intermediate coordinates of distorted image point locations" 1924. This refers to either storing the intermediate coordinates $(x_m, y_m)$, and by one example when processing is being performed a block at a time, and/or by providing the intermediate coordinates immediately for on-the-fly LUT-based LDC processing for example. This may include using the intermediate values to compute the input for the LUT as soon as the intermediate values are computed and as described below. While usually avoiding the need to store intermediate values by performing a complete transformation with a single upload of the pixel locations and image point locations to local on-board memory, the system could wait for a whole block to be processed by homography before starting the LDC operations (or vice-versa), and in this case, the intermediate coordinates may be stored in the on-board input buffer.

At this point, when the images are provided from a sensor of a common wide-angle lens (FOV from about 60 to 180 degrees), the process continues at A1 (FIG. 19B) to perform lens distortion correction (LDC). Otherwise, when an image is provided from a camera with an ultra-wide lens with an FOV over 180 degrees in spherical coordinates, the process continues at A2 (FIG. 19C) to perform dewarping instead of LDC, as explained with system 1800 (FIG. 18) above.

Continuing for now with process 1900 as if a common wide-angle lens was used to generate the images, process 1900 may include "perform lens distortion correction (LDC)" 1926, and by one form, this may refer to radii-ratio-based LDC, and by other forms this additionally refers to radii ratio LUT-based LDC. The examples herein explains homography combined with radii ratio LUT-based LDC as used herein for increased hardware efficiency. Alternatively, it will be appreciated that homography could be combined here with other LDC techniques not involving the radii ratio and LUT that still increases image quality due to the homography.

Continuing with the example, process 1900 may include "obtain radii of intermediate image and from center of distortion to intermediate pixel locations" 1928. This refers to obtaining the intermediate locations relative to a center of distortion, and then to use this radii as the undistorted radii as the input to the radii ratio LUT to obtain the radii ratio for the intermediate coordinate location on the intermediate distorted image 2100 for example. Thus, the intermediate points $(x_m, y_m)$ are now used to form the undistorted radii $R_u$.

This operation may be performed first by projecting the center of distortion to the intermediate image, such as image 2100 (FIG. 21). The center may be shifted per equation (9) for example, and the center $(X_c, Y_c)$, considering any shift, is set at a corresponding intermediate image coordinates $(x_{m-cd}, y_{m-cd})$ (where cd refers to center of distortion). This may be performed once for an entire image, and all blocks on the image to be corrected.

Next, $X_o$ and $Y_o$ are computed as the x and y differences between the $(x_{m-cd}, y_{m-cd})$ of the center of distortion and the current intermediate point $(x_m, y_m)$. Here, since the differences represent the intermediate distances, rather than the actual output pixel grid distances, $(X_o, Y_o)$ may be referred to as distances $(X_m, Y_m)$.

Then, equation (7) may be applied to obtain $R_u^2$ except using intermediate distances $(X_m, Y_m)$ calculated here and from the intermediate image. This may involve, as mentioned above, the square of $R_u$ to decrease computational load from a square root operation.

This may be repeated for each of the points in a block that are to be provided a ratio directly from the LUT. This could be all of the points in the block as used for the example here, some sampling, or some correspondence to anchor points from the final input image that are to be used to interpolate the ratios on more intermediate points on the final input image.

Process 1900 may include "determine radii ratio from look up table by using the intermediate radii" 1930. This may involve "use square of undistorted radii as the look up input value" 1932, where undistorted here may refer to the intermediate image instead. Thus, equation (8) is applied, and the $R_u^2$ value is used as the input to the radii ratio LUT to obtain the ratio $R_d/R_u$ for the current point $(x_m, y_m)$ being analyzed. As described above, the radii ratio LUT may be pre-determined and stored before the distortion correction operations during run-time.

Within each block, the internal image point locations and pixel location data may be analyzed in raster scan order. Further efficiency may be achieved from the raster-scan order of image scanning because the change in radii ratios between the neighboring pixels is very small and predictable, i.e., by one pixel horizontally down a row of pixels on an image for example. This can be used to reduce the time consumed performing the distortion correction of the image by simply adding one to the 'x' component of the first $R_u$ being computed in a row, and then to each x component of a $R_u$ in the row thereafter. Fractional locations can be handled the same way with or without varying the number added to the 'x' component. Slightly different application may be used when moving from one line to the next line, but even the speed of this can be improved by remembering the value in the above line and in the same column as the current pixel location being analyzed. For example, when horizontal coordinate 0 ($x_o$=0 or here $x_m$=0) is being analyzed, the difference would be that $y_o$ (or $y_m$) increased only by 1. This would make it the same as moving horizontally one pixel at a time.

Process 1900 may include "interpolate other radii ratios" 1934. This involves determining radii ratios for those points who have an $R_u$ not listed in the LUT. This be performed according to equation (10) as described above.

Process 1900 may include "determine matching image point locations on input image by using the ratios" 1936. Here, $X_i$ and $Y_i$ forming the distorted distances of $R_d$ may be computed using equations (5) and (6), and the process 1900 may optionally include "use scale factor" 1938 to adjust for non-concentric distortion, such as $Y_{const}$ described above for equation (6). $X_i$ and $Y_i$ are then converted to input distorted image point locations $(x_i, y_i)$.

Figure 22:
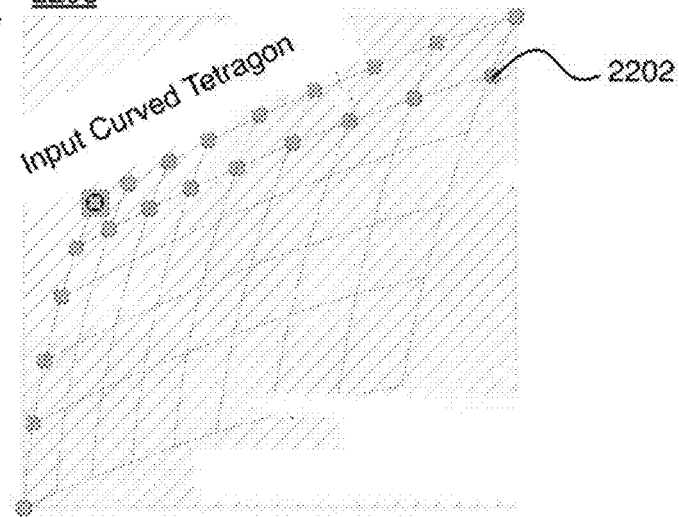
FIG. 22 is a diagram showing an input distorted and curved tetragon and input distorted image point locations corresponding to the intermediate locations of FIG. 21 and determined by using LDC according to at least one of the implementations herein.

The results of the radii ratio LUT-based LDC then are blocks of modified input distorted image points $(x_i, y_i)$ 2202, as shown on input distorted image 2200 (FIG. 22) for example.

Process 1900 also may include "compensate for tangential distortion" 1940. In conventional correction formulas, tangential distortion is modelled by the second part of the formulas:

$$x_d = x_u(1+K_1r^2+K_2r^4+\ldots)+(P_2(r^2 2x_u^2)+2P_1 x_u y_u) \quad (22)$$

$$y_d = y_u(1+K_1r^2+K_2r^4+\ldots)+(P_1(r^2+2y_u^2)+2P_2 x_u y_u) \quad (23)$$

where $(x_d, y_d)=(x_i, y_i)$, $(x_o, y_o)=(x_u, y_u)$, r is radius $R_u$, $P_1$ and $P_2$ are predetermined coefficients determined by experimentation, and K are predetermined constants. The first part (K, K2, . . . , etc.) models the radial distortion, and can be modelled by the proposed radii ratio look-up-table based approximation. The tangential part can be added to the results of the LDC, and according to the formulas (22) and (23) above.

Alternatively or additionally, however, since the presented GDC hardware supports a combination of homography and lens distortion, a large part of the tangential distortion can be approximated by readjusting the homography. This is accomplished by finding homography coefficients H that minimize the effect of the tangential distortion part. For example, if $P_1$ . . . are known, then two models are made: one with coefficients P and another replacing the first model by additional homography transformation. Then the homography coefficients are adjusted to minimize the difference of positions of a set of image points in the image plane predicted by both models (from output coordinates to input coordinates). Other alternatives may be contemplated as well.

Process 1900 may include "assign pixel data of matching image points to corresponding output grid pixel locations" 1942. Thus, the pixel data such as chroma and luminance data, of the matching input distorted image point $(x_i, y_i)$ may be assigned to the corresponding output pixel location $(x_o, y_o)$. As mentioned above, since the location of the input image point may be given with fractional (sub-pel) precision, a sub-pel output pixel location can be computed using higher-order interpolation (like Lanczos3, or bi-cubic) in order to achieve a smooth output picture when necessary as explained above with equation (11).

Process 1900 may include "b=B?" 1944. Now, a check is made to determine if the last block to be corrected on the current image has been analyzed. If not, process 1900 may continue with "obtain next block" 1946 and the counter is ticked up one where process 1900 may include "set b=b+1" 1946. The process then loops back to operation 1910 to obtain the output pixel grid locations of the next block. The process repeats until the last block B is corrected, and the process ends for this image, and the next image may be obtained when a sequence of images is being analyzed as in a video.

Referring to FIGS. 23-24, continuing with process 1900 for the case when an ultra-wide-angle lens is used to provide images, process 1900 may include "dewarp pixel locations" 1950. As mentioned above, this may be applied for 360 degree lenses, but could be applied for other sizes, especially ultra sizes with an FOV over 180 degrees and provided in spherical coordinates. This operation may include "determine Cartesian coordinates by using 360 degree lens parameters and dewarping block dimensions" 1952. One of the initial dewarping operations after homography is applied is to transform a (here modified or intermediate) block 2302 of image points with spherical coordinates in the distorted modified input image 2300 (another example is image 1814 of system 1800) into a block 2402 of pixels with Cartesian coordinates on a flat rectangular undistorted final output image 2400 (another example is shown as image 1818 of system 1800).

To perform this transformation, the following equations effectively unwind the circular image 2300 or 2500 and transform it to the rectangular output image 2400.

$$W_d = 2\pi r^2 \quad (24)$$

$$H_d = r_2 - r_1 \quad (25)$$

$$r = \frac{Y_o}{H_d} \cdot (r_2 - r_1) + r_1 \quad (26)$$

$$\theta = \frac{X_o}{W_d} 2\pi \quad (27)$$

$$X_i = X_c + r \cdot \sin(\theta) \quad (28)$$

$$Y_i = Y_c + r \cdot \cos(\theta) \quad (29)$$

where the center of the circular image is assumed to be the center of distortion $(X_c, Y_c)$ but need not always be. r1 and r2 are respectively the radial distances to the bottom and top of the circular image, and these are determined by lens calibration where test images are taken of objects with known geometry, and r1 and r2 are adjusted to correctly model the geometry. The radius r to the distorted input image point $(X_i, Y_i)$ in spherical coordinates is determined by equation (26). $(X_o, Y_o)$ is the output undistorted grid location (in units as distance to a projected center of distortion), or in the case when homography is applied first, the intermediate point location $(x_m, y_m)$.

Process 1900 may include "use dewarping LUT" 1954. Also, in the dewarping operations, a look-up table may be used to implement non-linear scaling by vertical axis directly correlated with radius (r) in Cartesian coordinate system. This refers to the LUT used to avoid division computations as explained above.

The result is an output image 2400 (FIG. 24) or 1818 (FIG. 18) with dimensions Wd×Hd and undistorted output pixel grid points $(X_o, Y_o)$ (or $(x_m, y_m)$) that are matched to distorted image points $(X_i, Y_i)$ converted to $(x_i, y_i)$.

Process 1900 may include "assign pixel data of matching image points to corresponding output grid pixel locations" 1956, and operates to place the chroma and luminance values of the image input points onto the assigned undistorted pixel locations as with operation 1942 of the LDC described above.

Process 1900 may include "b=B?" 1958, and if not, process 1900 may include "obtain next block" 1960 and "Set b=b+1" 1962. As with the LDC process, the process here loops back to operation 1910 to obtain the data of the next block when the last block has not been corrected yet. Otherwise, the process is ended for the current image, and may be repeated for more images.

As yet another alternative, it is possible to apply both dewarping, and then LDC once the dewarping is complete.

It will be appreciated that alternative processes to process 1900 still fall within the scope of the disclosure even though operations of process 1900 are skipped and/or are performed in a different order.

It will be appreciated that each component, unit, and module described herein may include those portions of code and/or hardware that provide the operations performed by that component, unit, and module regardless of where any of that code resides or what additional modules, units, and so forth any of that code and/or hardware is considered to be a part of.

It will also be understood that more components may be provided at imaging device 1800 than that described here such as encoders, decoders, transceivers, antennas, and so forth, much of which are mentioned in implementations 4000, 4100, and/or 4200 described below.

Referring again to FIGS. 3-4, the approach has been tested on two different images where image 300 provides an ~10% SMIA TV barrel distortion. Image 400 is the resulting corrected image that corrects image 300. An image providing a 50% SMIA TV moustache distortion (not shown) also was tested. The moustache distortion was considered fairly complex, having strong up-scaling approximately at the center, and down-scaling near the corners.

For each of the test images, the distortion curve compared against the actual ground truth distortion present is provided. The barrel distortion results and comparisons are provided on FIGS. 26, 5, 7-8 (already used as an example to explain distortion correction above), and 29-30. The moustache distortion results and comparisons are provided on FIGS. 31-39 and as follows.

Barrel Distortion Image

Figure 26:
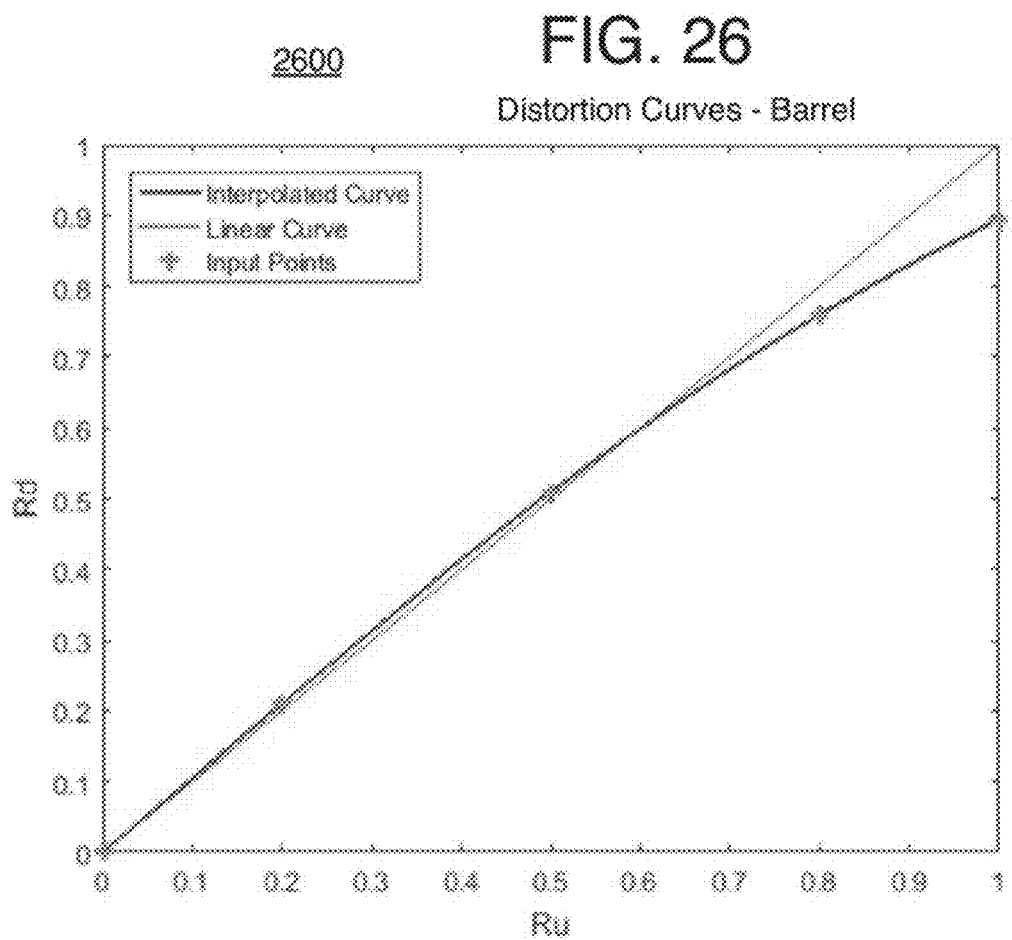
FIG. 26 is a graph of distortion curves for barrel distortion showing the difference between the disclosed interpolation curve method and the conventional linear curve method when forming a radii ratio for image distortion correction.

Referring to FIG. 26, a graph 2600 shows a distortion curve for barrel distortion where the resulting distortion correction interpolated curve is generated from the LDC methods above, and is shown with the image or input points on the curve. The linear curve (simply titled that way because it is more linear) is the ground truth of the actual distortion, computed at 1 million points as described above with the MATLAB methodology. The difference shows the generated radii ratios from the disclosed methods compared to the ground truth ratios.

Referring again to FIGS. 5 and 7-8, and as already described above, image 500 shows a conventional (or legacy) barrel distortion correction providing equidistant points on a grid, and images 700 and 800 compare the conventional correction of image 500 to the correction performed by using the LDC methods herein (without the homography). The correct image point positions 706 are outside the bounding box 704 of the conventional correction.

Figure 27:
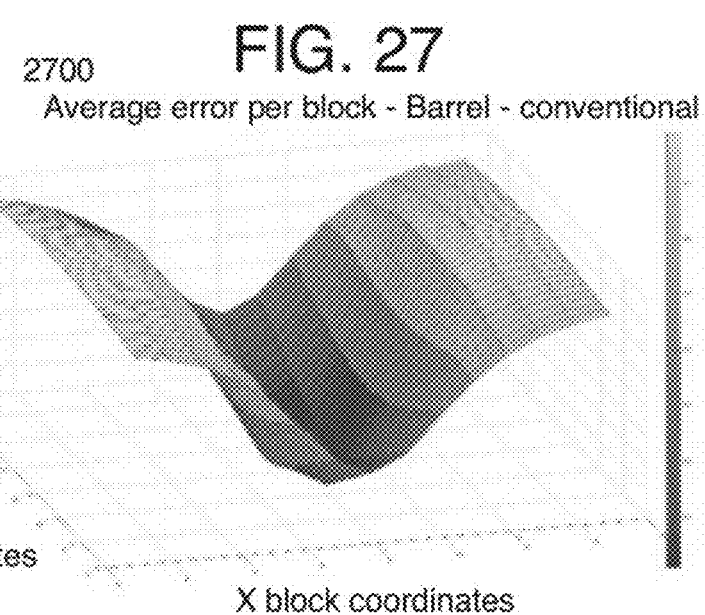
FIG. 27 is a graph of average error per block for barrel distortion using a conventional method of distortion correction.
Figure 28:
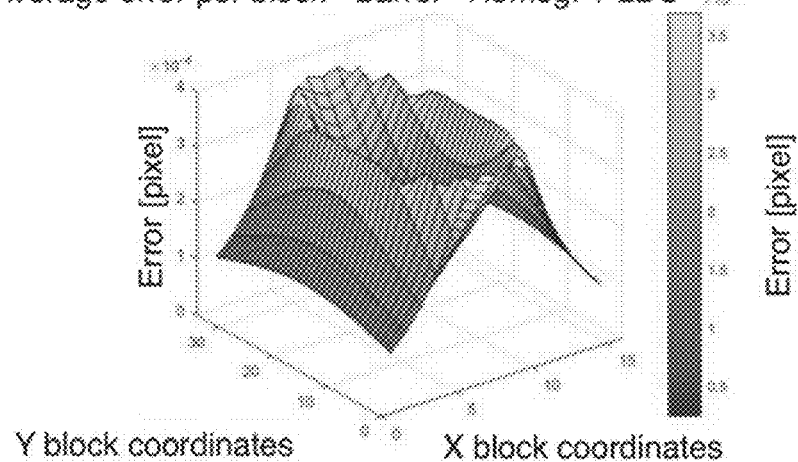
FIG. 28 is a graph of average error per block for barrel distortion using a method of distortion correction according to at least one of the implementations herein.

Referring to FIGS. 27-28, a chart 2700 shows the average per block error for the legacy barrel distortion correction method ranging in error up to about 0.7 pixels, while chart 2800 shows the average error per block for the barrel distorted image using the disclosed LDC methods ranging in error up to about $3.5 \times 10^{-4}$ pixels. Both were formed by comparing the methods to the ground truth computed at one million points as described above. Thus, several orders of magnitude in difference exist between the two charts showing that there is a substantial reduction in error by the disclosed methods.

Figure 29:
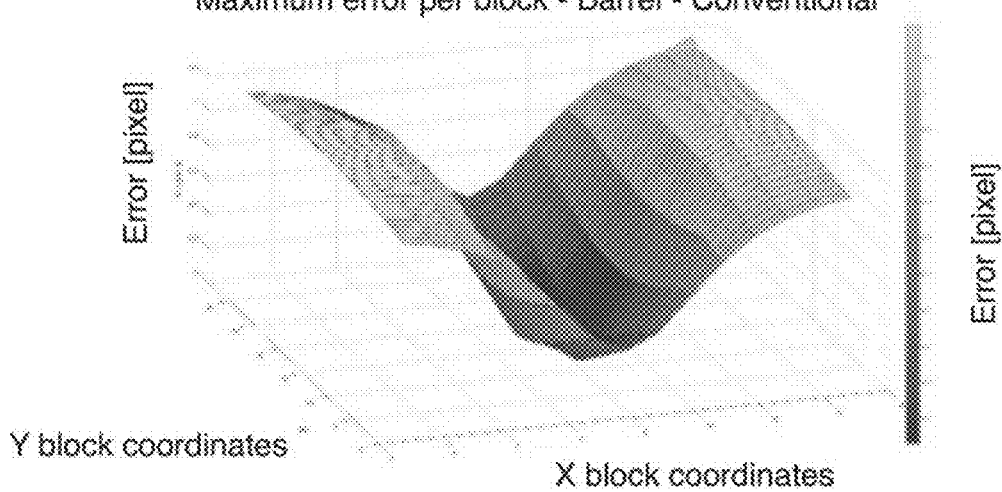
FIG. 29 is a graph of maximum error per block for barrel distortion using a conventional method of distortion correction.
Figure 30:
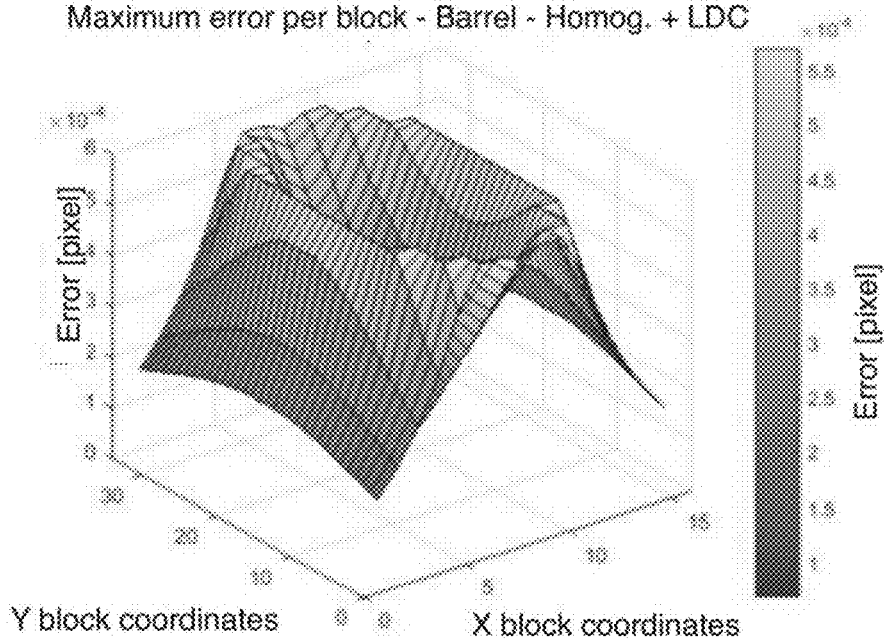
FIG. 30 is a graph of maximum error per block for barrel distortion using a method of distortion correction according to at least one of the implementations herein.

Referring to FIGS. 29-30, a chart 2900 shows the maximum per block error for the legacy barrel distortion correction method ranging in error up to about 1.1 pixels, while chart 3000 shows the maximum error per block for the barrel distorted image using the disclosed LDC methods ranging in error up to about $5.5 \times 10^{-4}$ pixels. Both were formed by comparing the methods to the ground truth computed at one million points as described above. Thus, several orders of magnitude in difference exist between the two charts showing that there is a substantial reduction in error by the disclosed methods.

Moustache Distortion Image

Figure 31:
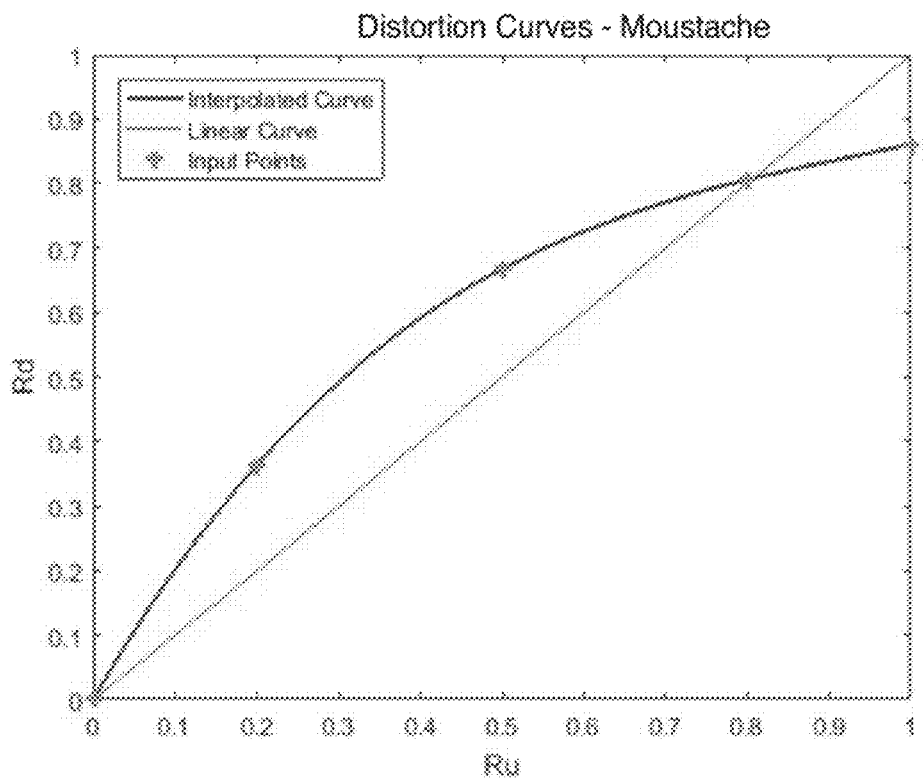
FIG. 31 is a graph of distortion curves for moustache distortion showing the difference between the disclosed interpolation curve method and the conventional linear curve method when forming a radii ratio for image distortion correction.

Referring to FIG. 31, a graph 3100 shows a distortion curve for moustache distortion where the resulting distortion correction interpolated curve is generated from the LDC methods above, and is shown with the image or input points on the curve. The linear curve (simply titled that way because it is more linear) is the ground truth of the actual distortion, computed at 1 million points as described above with the MATLAB methodology. The difference shows the generated radii ratios from the disclosed methods compared to the ground truth ratios.

Figure 32:
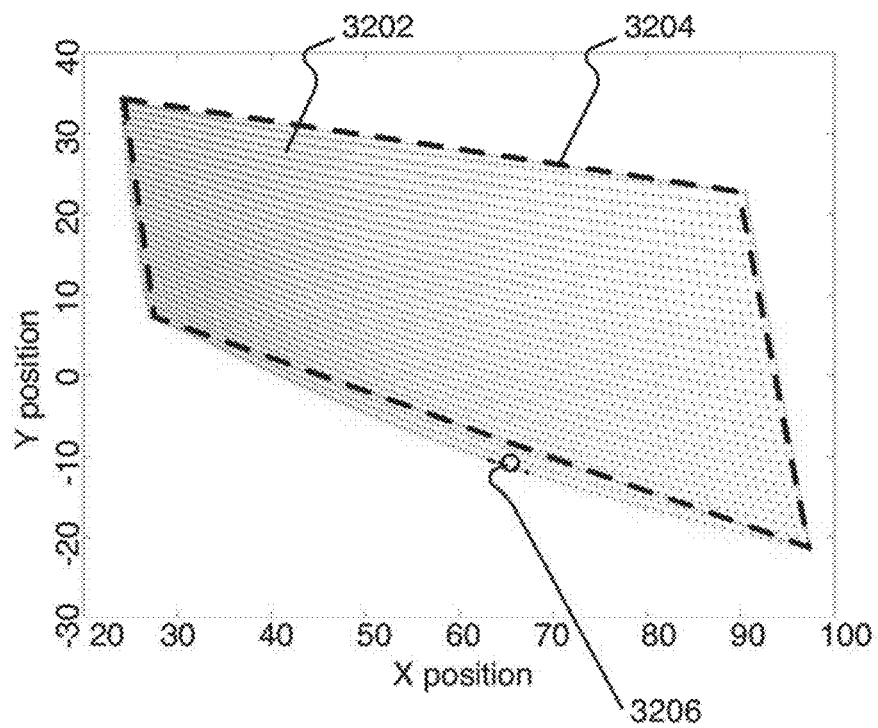
FIG. 32 is a schematic diagram of an undistorted corrected image showing the resulting pattern of image points of both a conventional distortion correction method and a distortion correction method according to at least one of the implementations disclosed herein for a corner block of a moustache distortion.
Figure 33:
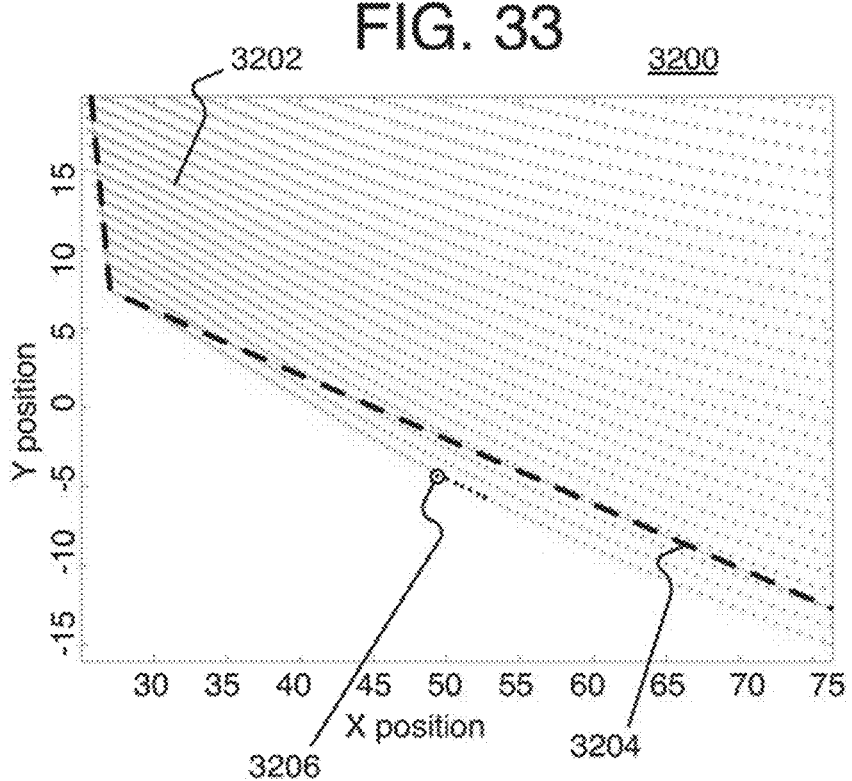
FIG. 33 is a schematic diagram of a close-up of the image point pattern of FIG. 32.

Referring to FIGS. 32-33, image 3200 shows a grid 3202 of a corner block of the moustache distortion correction provided by the LDC methods disclosed herein, and a bounding box 3204 providing the legacy correction, and showing correct image point positions 3206 are outside the bounding box 3204 of the conventional correction, revealing the inaccuracy of the legacy method.

Figure 34:
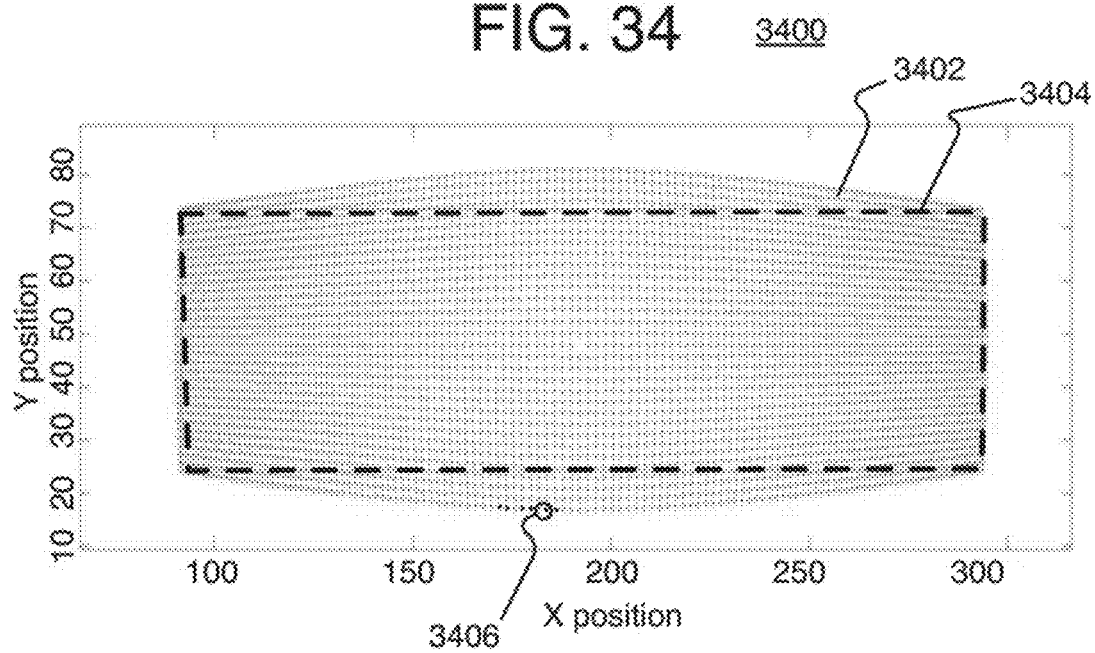
FIG. 34 is a schematic diagram of an undistorted corrected image showing the resulting pattern of image points of both a conventional distortion correction method and a distortion correction method according to at least one of the implementations disclosed herein for a center block of a moustache distortion.
Figure 35:
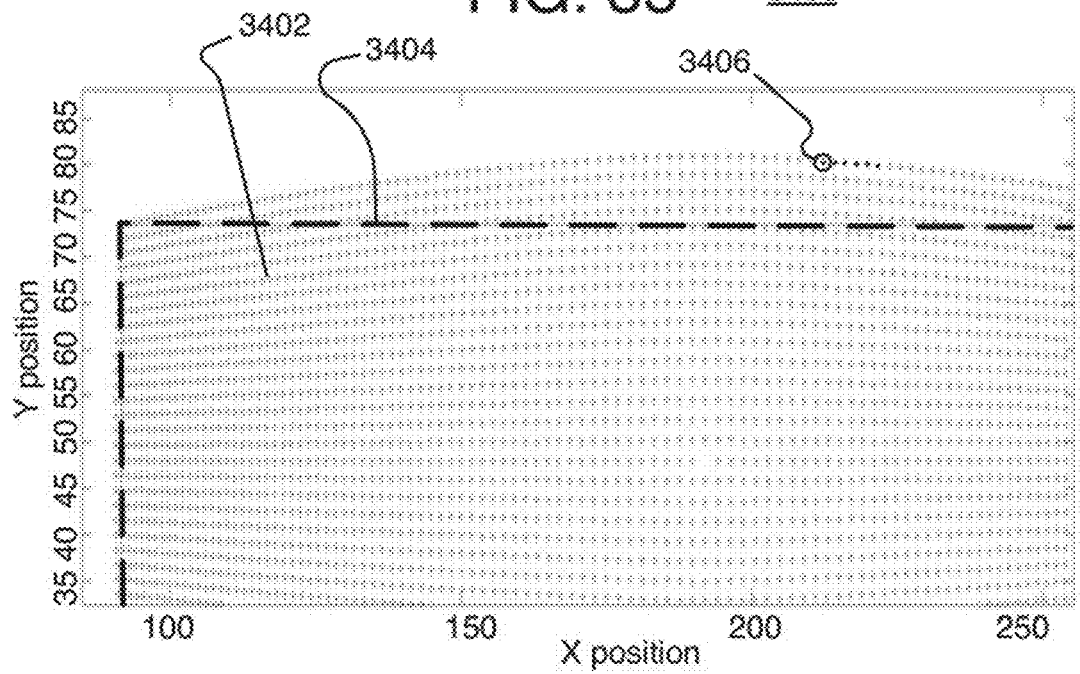
FIG. 35 is a schematic diagram of a close-up of the image point pattern of FIG. 34.

Referring to FIGS. 34-35, image 3400 shows a grid 3402 of a center block of the moustache distortion correction provided by the LDC methods disclosed herein, and a bounding box 3404 providing the legacy correction, and showing correct image point positions 3406 are outside the bounding box 3404 of the conventional correction, revealing the inaccuracy of the legacy method.

Figure 36:
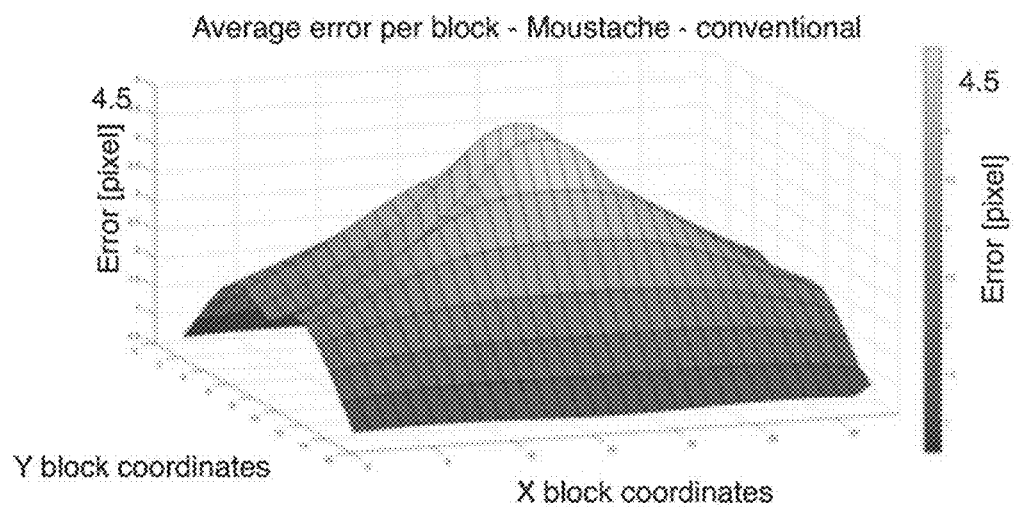
FIG. 36 is a graph of average error per block for moustache distortion using a conventional method of distortion correction.
Figure 37:
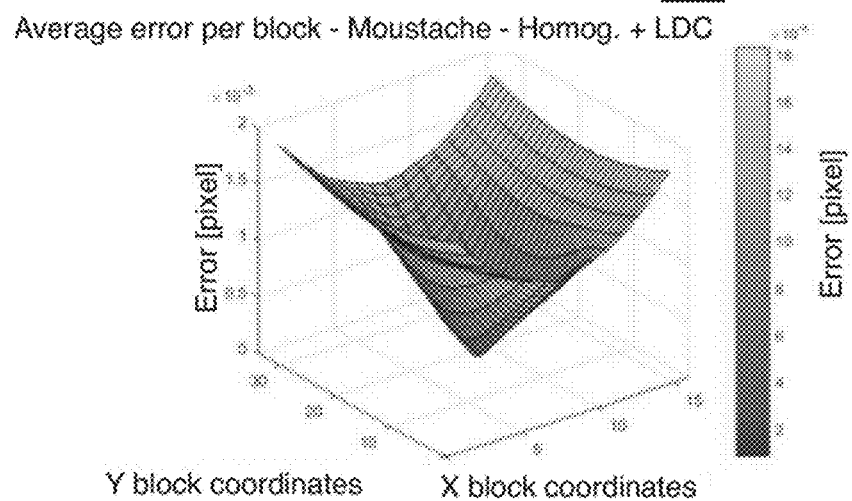
FIG. 37 is a graph of average error per block for moustache distortion using a method of distortion correction according to at least one of the implementations herein.

Referring to FIGS. 36-37, a chart 3600 shows the average per block error for the legacy moustache distortion correction method ranging in error up to about 4.0 pixels, while chart 3700 shows the average error per block for the barrel distorted image using the disclosed LDC methods ranging in error up to about $2.0 \times 10^{-3}$ pixels. Both were formed by comparing the methods to the ground truth computed at one million points as described above. Thus, several orders of magnitude in difference exist between the two charts showing that there is a substantial reduction in error by the disclosed methods.

Referring to FIGS. 38-39, a chart 3800 shows the maximum per block error for the legacy moustache distortion correction method ranging in error up to about 6.0 pixels, while chart 3900 shows the maximum error per block for the barrel distorted image using the disclosed LDC methods ranging in error up to about $3.0 \times 10^{-3}$ pixels. Both were formed by comparing the methods to the ground truth computed at one million points as described above. Thus, several orders of magnitude in difference exist between the two charts showing that there is a substantial reduction in error by the disclosed methods.

Figure 40:
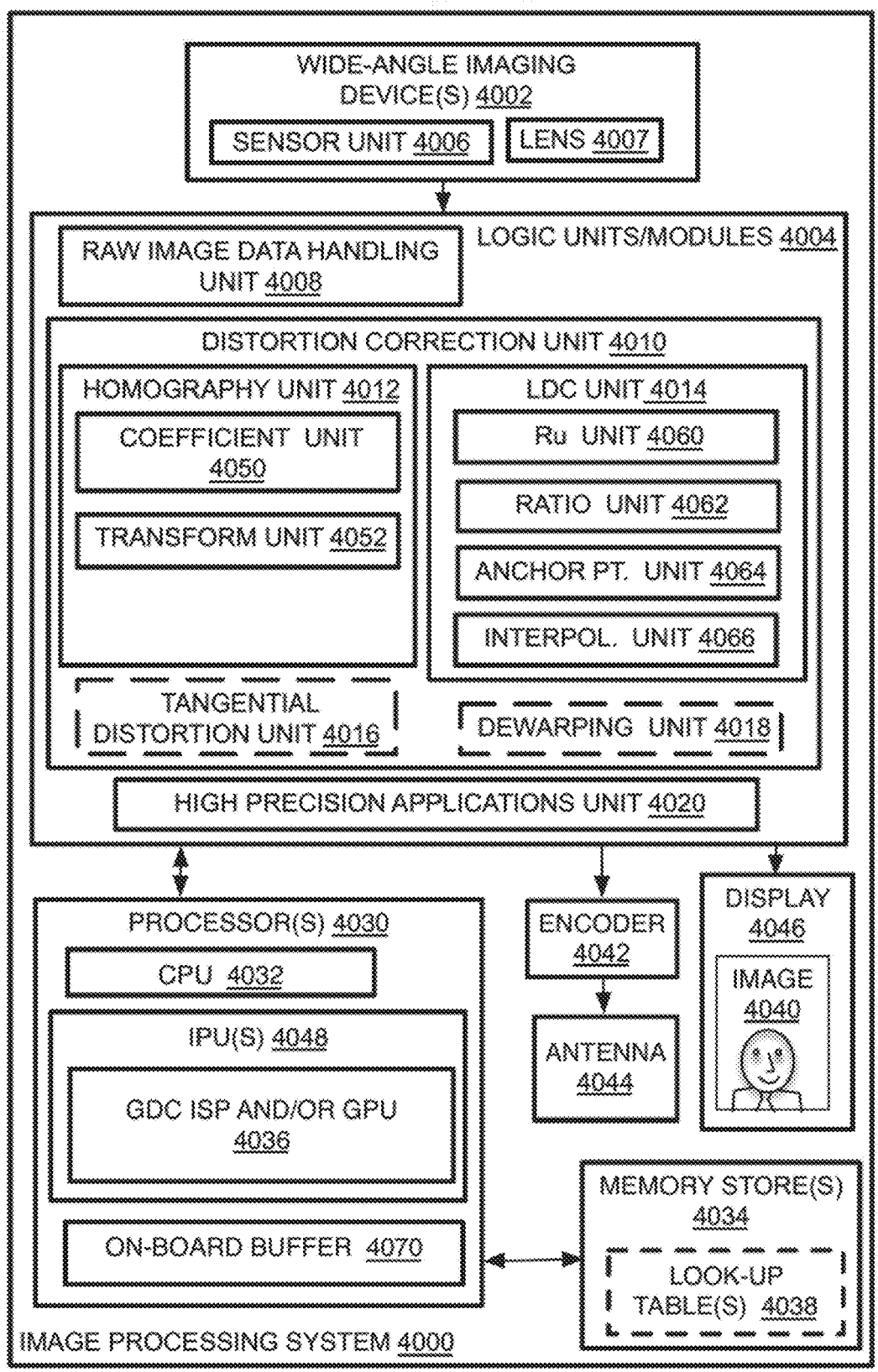
FIG. 40 is an illustrative diagram of an example system for providing distortion correction for wide-angle lenses according to at least one of the implementations herein.

Referring to FIG. 40, an example system 4000 for providing image distortion correction for wide-angle lenses is arranged in accordance with at least some implementations of the present disclosure. In various implementations, the example image processing system 4000 may have a wide angle imaging device 4002 to form or receive captured image data. This can be implemented in various ways. Thus, in one form, the image processing system 4000 may be a digital camera or other image capture device, and imaging device 4002, in this case, may be the camera hardware and camera sensor software, module, or component 4006. In other examples, imaging processing system 4000 may have an imaging device 4002 that includes or may be a camera, and logic modules 4004 may communicate remotely with, or otherwise may be communicatively coupled to, the imaging device 4002 for further processing of the image data. In any of these examples, the imaging device 4002 has at least one wide-angle lens 4007 of any type as described above.

This technology may include a camera such as a digital camera system, a dedicated camera device, or an imaging smartphone or tablet, whether a still picture or video camera, or device with a preview screen, or some combination of these. Thus, in one form, imaging device 4002 may include camera hardware and optics with one or more lenses and including one or more sensors as described above as well as auto-focus, zoom, aperture, ND-filter, auto-exposure, flash, and actuator controls, and including multiple alternative lenses. The sensor controls may be part of a sensor module or component 4006 for operating the sensor. The controls of the sensor component 4006 may be part of the imaging device 4002, or may be part of the logical modules 4004 or both. Such sensor component can be used to generate images for a viewfinder, which may include a preview screen, and take still pictures or video. The imaging device 4002 also may have an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 4002 may be provided with an eye tracking camera.

In the illustrated example and relevant here, the logic modules 4004 may include a raw image data handling unit 4008 that performs pre-processing on the image data sufficient for correcting distortion and other desired image processing functions. The logic modules 4004 may include a distortion correction unit 4010 with a homography unit 4012, an LDC unit 4014, a tangential distortion unit 4016, and a dewarping unit 4018. The logic units also may include a high precision application unit 4020 that uses the corrected output of the distortion correction unit 4010 whether to modify image data further or display the images.

The homography unit 4012 may have a coefficient unit 4050 for generating homography coefficients, and a transform unit 4052 that applies the homography. The LDC unit 4014 may have an Ru unit 4060 to generate Ru's, a ratio unit 4062 that controls the LUT to provide radii ratios, an anchor point unit 4064 that computes Rd's from the ratios, and interpolation unit 4066 that provides interpolated ratios for image points between the anchor points. The operation of these components are described above, and components and operations mentioned above and that correspond to these components, such as in system 1800 and process 1900, are clear from the context and names of these components and operations.

The components of logic modules 4004 including those components of the distortion correction unit 4010 may be operated by, or even entirely or partially located at, at least one processor 4030, and which may include one or more image processing units (IPUs) 4048 each with its own, or access to, one or more GDC hardware image signal processors (ISPs) and/or graphical processing units (GPUs) 4036, and may include other hardware manipulation functionality. These IPU units 4048 may or may not be exclusively dedicated to performing distortion correction tasks as described above.

The logic modules 4004 may be communicatively coupled to the components of the imaging device 4002 in order to receive raw image data. Optionally, data may be provided by a data stream separate from the raw image data stream. In these cases, it is assumed the logic modules 4004 are considered to be separate from the imaging device. This need not be so, and the logic modules very well may be considered to be part of the imaging device as well.

System 4000 may include one or more processors 4030 and memory stores 4034. In the example of system 4000, memory stores 4034 may store image content such as captured images (or image frames) and data related to distortion correction including any of the look-up tables 4038 mentioned above. This also may include any input, intermediate computation, or output data related to the distortion correction as well, or other data as discussed herein.

The processor(s) 4030 also may include on-board memory such as one or more buffers to hold GDC data being processed such as intermediate pixel coordinates, ratios or other data selected from one of the LUTs, and so forth.

The ISP and/or GPU 4036 may include any number and type of graphics processing units that may provide the operations as discussed herein. Such operations may be implemented via software or hardware or a combination thereof. For example, graphics processing unit 4036 may include circuitry dedicated to manipulate images obtained from memory stores 4034. Processor(s) 4030 may include any number and type of processing units or modules that may provide control and other high level functions for system 4000 and/or provide any operations as discussed herein. Memory stores 4034 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 4034 may be implemented by cache memory. Otherwise, memory 4034 may be an EEPROM or device file system. By one form, one or more units of image processing system 4000 and distortion correction unit 4010 may be implemented via an execution unit (EU) of ISPs 4036 on an IPU 4048. The EU may include, for example, programmable logic or circuitry such as a logic core or cores that may provide a wide array of programmable logic functions. In one form, any of these units may be implemented via dedicated hardware such as fixed function circuitry or the like. Fixed function circuitry may include dedicated logic or circuitry and may provide a set of fixed function entry points that may map to the dedicated logic for a fixed purpose or function.

Various components of the systems described herein may be implemented in software, firmware, and/or hardware and/or any combination thereof. For example, various components of imaging device or system 1800 or 4000 may be, or may be provided, at least in part, by hardware of, a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of imaging device or system 1800 or 4000, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

FIG. 41 is an illustrative diagram of an example system 4100, arranged in accordance with at least some implementations of the present disclosure. In various implementations, system 4100 may be a media system although system 4100 is not limited to this context. For example, system 4100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 4100 includes a platform 4102 coupled to a display 4120. Platform 4102 may receive content from a content device such as content services device(s) 4130 or content delivery device(s) 4140 or other similar content sources. A navigation controller 4150 including one or more navigation features may be used to interact with, for example, platform 4102 and/or display 4120. Each of these components is described in greater detail below.

In various implementations, platform 4102 may include any combination of a chipset 4105, processor 4110, memory 4112, antenna 4113, storage 4114, graphics subsystem 4115, applications 4116 and/or radio 4118. Chipset 4105 may provide intercommunication among processor 4110, memory 4112, storage 4114, graphics subsystem 4115, applications 4116 and/or radio 4118. For example, chipset 4105 may include a storage adapter (not depicted) capable of providing intercommunication with storage 4114.

Processor 4110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 4110 may be dual-core processor(s), dual-core mobile processor(s), and so forth.

Memory 4112 may be implemented as a volatile memory device such as, but not limited to, a Random Access Memory (RAM), Dynamic Random Access Memory (DRAM), or Static RAM (SRAM).

Storage 4114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 4114 may include technology to increase the storage performance enhanced protection for valuable digital media when multiple hard drives are included, for example.

Graphics subsystem 4115 may perform processing of images such as still or video for display. Graphics subsystem 4115 may be a graphics processing unit (GPU) or a visual processing unit (VPU), for example. An analog or digital interface may be used to communicatively couple graphics subsystem 4115 and display 4120. For example, the interface may be any of a High-Definition Multimedia Interface, DisplayPort, wireless HDMI, and/or wireless HD compliant techniques. Graphics subsystem 4115 may be integrated into processor 4110 or chipset 4105. In some implementations, graphics subsystem 4115 may be a stand-alone device communicatively coupled to chipset 4105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 4118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 4118 may operate in accordance with one or more applicable standards in any version.

In various implementations, display 4120 may include any television type monitor or display. Display 4120 may include, for example, a computer display screen, touch screen display, video monitor, television-like device, and/or a television. Display 4120 may be digital and/or analog. In various implementations, display 4120 may be a holographic display. Also, display 4120 may be a transparent surface that may receive a visual projection. Such projections may convey various forms of information, images, and/or objects. For example, such projections may be a visual overlay for a mobile augmented reality (MAR) application. Under the control of one or more software applications 4116, platform 4102 may display user interface 4122 on display 4120.

In various implementations, content services device(s) 4130 may be hosted by any national, international and/or independent service and thus accessible to platform 4102 via the Internet, for example. Content services device(s) 4130 may be coupled to platform 4102 and/or to display 4120. Platform 4102 and/or content services device(s) 4130 may be coupled to a network 4160 to communicate (e.g., send and/or receive) media information to and from network 4160. Content delivery device(s) 4140 also may be coupled to platform 4102 and/or to display 4120.

In various implementations, content services device(s) 4130 may include a cable television box, personal computer, network, telephone, Internet enabled devices or appliance capable of delivering digital information and/or content, and any other similar device capable of uni-directionally or bi-directionally communicating content between content providers and platform 4102 and/display 4120, via network 4160 or directly. It will be appreciated that the content may be communicated uni-directionally and/or bi-directionally to and from any one of the components in system 4100 and a content provider via network 4160. Examples of content may include any media information including, for example, video, music, medical and gaming information, and so forth.

Content services device(s) 4130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 4102 may receive control signals from navigation controller 4150 having one or more navigation features. The navigation features of controller 4150 may be used to interact with user interface 4122, for example. In various embodiments, navigation controller 4150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 4150 may be replicated on a display (e.g., display 4120) by movements of a pointer, cursor, focus ring, or other visual indicators displayed on the display. For example, under the control of software applications 4116, the navigation features located on navigation controller 4150 may be mapped to virtual navigation features displayed on user interface 4122, for example. In various embodiments, controller 4150 may not be a separate component but may be integrated into platform 4102 and/or display 4120. The present disclosure, however, is not limited to the elements or in the context shown or described herein.

In various implementations, drivers (not shown) may include technology to enable users to instantly turn on and off platform 4102 like a television with the touch of a button after initial boot-up, when enabled, for example. Program logic may allow platform 4102 to stream content to media adaptors or other content services device(s) 4130 or content delivery device(s) 4140 even when the platform is turned "off." In addition, chipset 4105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 4100 may be integrated. For example, platform 4102 and content services device(s) 4130 may be integrated, or platform 4102 and content delivery device(s) 4140 may be integrated, or platform 4102, content services device(s) 4130, and content delivery device(s) 4140 may be integrated, for example. In various embodiments, platform 4102 and display 4120 may be an integrated unit. Display 4120 and content service device(s) 4130 may be integrated, or display 4120 and content delivery device(s) 4140 may be integrated, for example. These examples are not meant to limit the present disclosure.

In various embodiments, system 4100 may be implemented as a wireless system, a wired system, or a combination of both. When implemented as a wireless system, system 4100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 4102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 41.

Referring to FIG. 42, a small form factor device 4200 is one example of the varying physical styles or form factors in which systems 4000 or 4100 may be embodied. By this approach, device 4200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, and cameras (e.g. wide-angle lens cameras, ultra-wide-angle lens cameras, fisheye cameras, 360 degree cameras, point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some embodiments may be described with a mobile computing device implemented as a smart phone by way of example, it may be appreciated that other implementations may be implemented using other wireless mobile computing devices as well. The implementations are not limited in this context.

As shown in FIG. 42, device 4200 may include a housing with a front 4201 and a back 4202. Device 4200 includes a display 4204, an input/output (I/O) device 4206, and an integrated antenna 4208. Device 4200 also may include navigation features 4212. I/O device 4206 may include any suitable I/O device for entering information into a mobile computing device. Examples for I/O device 4206 may include an alphanumeric keyboard, a numeric keypad, a touch pad, input keys, buttons, switches, microphones, speakers, voice recognition device and software, and so forth. Information also may be entered into device 4200 by way of microphone 4214, or may be digitized by a voice recognition device. As shown, device 4200 may include a camera 4205 (e.g., including at least one lens as described herein, aperture, and imaging sensor) and a flash 4210 integrated into back 4202 (or elsewhere) of device 4200. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

A computer-implemented method of camera lens distortion correction comprises receiving location data of image points on at least one distorted image of a scene and distorted by a wide-angle camera lens; receiving pixel locations of an undistorted pixel grid to be used to form an undistorted image showing the scene; determining radii extending from a distortion center and to either individual image point locations on the distorted image or pixel locations on the undistorted pixel grid; obtaining a ratio between distorted and undistorted radii values by using at least one of the radii to look up the ratio on a look-up table (LUT); determining a correspondence between one of the pixel locations and a corresponding one of the image point locations by using the ratio, and repeating with different pixel locations or image point locations to form a plurality of correspondences; and constructing the undistorted image by using the plurality of correspondences to place image data on the undistorted pixel locations.

By another implementation, the method may include wherein the radii extend from the distortion center on the distorted image and extending to individual image point locations on the distorted image; wherein the radii extend from the distortion center projected onto the undistorted pixel grid and extending to pixel locations on the undistorted pixel grid; and wherein the input values to the LUT is the square of the radii. The method also comprises forming multiple LUTs each for a wide-angle lens of different field of view; saving at least one of the LUTs on a memory accessible to a processor performing the distortion correction on images from a camera using a lens associated with the LUT; and at least one of: (1) forming a single LUT for a particular field of view angle, and (2) forming the LUT by using a spline operation. The method also may comprise obtaining the correspondence separately in both a horizontal and vertical direction to provide 2D coordinates of the image by using the ratio separately in two equations; applying a scaling value in one of the equations when distortion is not the same in both the horizontal and vertical directions.

The method also may include wherein using radii ratios to determine the correspondences is referred to as a lens distortion correction (LDC); and the method comprising performing a homography-based distortion correction with multiple coefficients of multiple degrees of freedom either (a) before the LDC is performed to provide modified image point locations to be used as the undistorted pixel locations to determine radii of the pixel locations while performing the LDC, or (b) after the LDC is performed to further modify the correspondence between image point locations and the pixel locations on the undistorted image. The method may further comprise wherein the undistorted image point locations placed on the corresponding pixel locations at the undistorted image are anchor points, and the method comprising interpolating points between the anchor points on the undistorted image; using an image processing unit other than a central processing unit (CPU) to perform the interpolation of distortion correction operations; dividing the images into blocks; and performing the distortion correction by image processing hardware other than a central processing unit and having a capacity set in association with a size of a single block.

By yet another implementation, a system of camera lens distortion correction comprises at least one memory; at least one processor communicatively coupled to the memory; and a distortion correction unit operated by the at least one processor unit to operate by: receiving location data of image points of at least one distorted image of a scene and distorted by a wide-angle camera lens; receiving pixel locations of an undistorted pixel grid; performing a first correction operation using the image point locations and pixel locations to generate intermediate image point locations; performing a second correction operation using the intermediate image point locations to generate modified image point locations to be used to form an undistorted image of the scene; performing a homography-based distortion correction with multiple homography coefficients as one of the first and second operations; and performing a non-homography lens distortion correction (LDC).

By another example, the system includes wherein the homography is performed either before or after the LDC; and wherein performing the homography-based distortion correction comprises performing inverse homography computations using homography coefficient equations that use undistorted pixel grid locations as an input to the equations to compute matching distorted image point locations. The system having the distortion correction unit operating by dividing the image into blocks; obtaining predetermined homography coefficients to be used with a particular camera and with a particular lens on the camera; applying homography coefficients on at least one block that are different than the homography coefficients of at least one other block; and while performing both the first and second correction operation block-by-block. The system also includes wherein the at least one processing unit performing the distortion correction is image processing hardware other than a central processing unit and having a capacity set in association with a size of a single block; and wherein the distortion correction unit operates by computing a tangential distortion component at least one of: (a) added to resulting coordinate values of the distorted input image coordinates determined after applying LUT-based LDC, and (b) used to adjust homography coefficients; wherein performing the LDC is based, at least in part, on ratios of radii extending from a distortion center and to both individual image point locations on the distorted image and pixel locations on the undistorted pixel grid. The system also includes that the ratios are obtained from at least one predetermined look-up table.

By one approach, at least one computer readable medium comprises a plurality of instructions that in response to being executed on a computing device, cause the computing device to operate by: receiving location data of image points of at least one distorted image of a scene and distorted by a wide-angle camera lens; receiving pixel locations of an undistorted pixel grid; performing a first correction operation using the image point locations and pixel locations to generate intermediate image point locations; performing a second correction operation using the intermediate image point locations to generate modified image point locations to be used to form an undistorted image of the scene; performing a homography-based distortion correction with multiple homography coefficients as one of the first and second operations; and providing the option to perform either of (1) or (2) depending on a size of a field of view of a wide angle lens forming the distorted image as the other of the first and second operations, wherein (1) is a non-homography lens distortion correction (LDC), and (2) is a dewarping correction that transforms spherical coordinates into Cartesian coordinates. By another approach, the instructions include that wherein the LDC uses a radii-ratio look-up table.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of camera lens distortion correction comprising:
    receiving location data of image points on at least one distorted image of a scene and distorted by a wide-angle camera lens;
    receiving pixel locations of an undistorted pixel grid to be used to form an undistorted image showing the scene;
    determining radii extending from a distortion center and to either individual image point locations on the distorted image or pixel locations on the undistorted pixel grid;
    obtaining a ratio between distorted and undistorted radii values by using at least one of the radii to look up the ratio on a look-up table (LUT), wherein a single LUT is formed for a particular field of view angle;
    determining a correspondence between one of the pixel locations and a corresponding one of the image point locations by using the ratio, and repeating with different pixel locations or image point locations to form a plurality of correspondences; and
    constructing the undistorted image by using the plurality of correspondences to place image data on the undistorted pixel locations.

2. The method of claim 1 wherein the radii extend from the distortion center on the distorted image and extending to individual image point locations on the distorted image.

3. The method of claim 1 wherein the radii extend from the distortion center projected onto the undistorted pixel grid and extending to pixel locations on the undistorted pixel grid.

4. The method of claim 1 wherein the input values to the LUT is the square of the radii.

5. The method of claim 1 comprising forming multiple LUTs each for a wide-angle lens of different field of view; and
    saving at least one of the LUTs on a memory accessible to a processor performing the distortion correction on images from a camera using a lens associated with the LUT.

6. The method of claim 1 comprising forming the LUT by using a spline operation.

7. The method of claim 1 comprising:
obtaining the correspondence separately in both a horizontal and vertical direction to provide 2D coordinates of the image by using the ratio separately in two equations; and
applying a scaling value in one of the equations when distortion is not the same in both the horizontal and vertical directions.

8. The method of claim 1 wherein using radii ratios to determine the correspondences is referred to as a lens distortion correction (LDC); and the method comprising performing a homography-based distortion correction with multiple coefficients of multiple degrees of freedom before the LDC is performed to provide modified image point locations to be used as the undistorted pixel locations to determine radii of the pixel locations while performing the LDC.

9. The method of claim 1 wherein using radii ratios to determine the correspondences is referred to as a lens distortion correction (LDC); and the method comprising performing a homography-based distortion correction with multiple coefficients of multiple degrees of freedom after the LDC is performed to further modify the correspondence between image point locations and the pixel locations on the undistorted image.

10. The method of claim 1 wherein the undistorted image point locations placed on the corresponding pixel locations at the undistorted image are anchor points, and the method comprising interpolating points between the anchor points on the undistorted image.

11. The method of claim 10 comprising using an image processing unit other than a central processing unit (CPU) to perform the interpolation of distortion correction operations.

12. The method of claim 1 comprising dividing the images into blocks; and performing the distortion correction by image processing hardware other than a central processing unit and having a capacity set in association with a size of a single block.

13. A system of camera lens distortion correction, comprising:
at least one memory;
at least one processor communicatively coupled to the memory; and
a distortion correction unit operated by the at least one processor unit to operate by:
  receiving location data of image points of at least one distorted image of a scene and distorted by a wide-angle camera lens;
  receiving pixel locations of an undistorted pixel grid;
  performing a first correction operation using the image point locations and pixel locations to generate intermediate image point locations;
  performing a second correction operation using the intermediate image point locations to generate modified image point locations to be used to form an undistorted image of the scene;
  performing a homography-based distortion correction with multiple homography coefficients as one of the first and second operations; and
  performing a non-homography lens distortion correction (LDC).

14. The system of claim 13, wherein the homography is performed before the LDC.

15. The system of claim 13 wherein the homography is performed after the LDC.

16. The system of claim 13 wherein performing the homography-based distortion correction comprises performing inverse homography computations using homography coefficient equations that use undistorted pixel grid locations as an input to the equations to compute matching distorted image point locations.

17. The system of claim 13 comprising dividing the image into blocks; obtaining predetermined homography coefficients to be used with a particular camera and with a particular lens on the camera; and applying homography coefficients on at least one block that are different than the homography coefficients of at least one other block.

18. The system of claim 13 comprising:
dividing the images into blocks; and
performing both the first and second correction operation block-by-block.

19. The system of claim 18, wherein the at least one processing unit performing the distortion correction is image processing hardware other than a central processing unit and having a capacity set in association with a size of a single block.

20. The system of claim 13 wherein the distortion correction unit operates by computing a tangential distortion component at least one of:
added to resulting coordinate values of the distorted input image coordinates determined after applying LUT-based LDC, and
used to adjust homography coefficients.

21. The system of claim 13 wherein performing the LDC is based, at least in part, on ratios of radii extending from a distortion center and to both individual image point locations on the distorted image and pixel locations on the undistorted pixel grid.

22. The system of claim 21 wherein the ratios are obtained from at least one predetermined look-up table.

23. At least one non-transitory machine readable medium comprising a plurality of instructions that in response to being executed on a computing device, cause the computing device to be operated by:
receiving location data of image points of at least one distorted image of a scene and distorted by a wide-angle camera lens;
receiving pixel locations of an undistorted pixel grid;
performing a first correction operation using the image point locations and pixel locations to generate intermediate image point locations;
performing a second correction operation using the intermediate image point locations to generate modified image point locations to be used to form an undistorted image of the scene;
performing a homography-based distortion correction with multiple homography coefficients as one of the first and second operations; and
providing the option to perform either of (1) or (2) depending on a size of a field of view of a wide angle lens forming the distorted image as the other of the first and second operations, wherein
(1) is a non-homography lens distortion correction (LDC), and
(2) is a dewarping correction that transforms spherical coordinates into Cartesian coordinates.

24. The machine readable medium of claim 23, wherein the LDC uses a radii-ratio look-up table.

* * * * *